(12) United States Patent
Schpok

(10) Patent No.: US 10,733,777 B2
(45) Date of Patent: Aug. 4, 2020

(54) ANNOTATION GENERATION FOR AN IMAGE NETWORK

(71) Applicant: Google LLC, Mountain View, CA (US)

(72) Inventor: Joshua Sam Schpok, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/007,106

(22) Filed: Jun. 13, 2018

(65) Prior Publication Data

US 2019/0051029 A1 Feb. 14, 2019

Related U.S. Application Data

(60) Provisional application No. 62/543,848, filed on Aug. 10, 2017.

(51) Int. Cl.
| | | |
|---|---|---|
| *G06T 11/60* | (2006.01) | |
| *G06F 16/583* | (2019.01) | |
| *G06T 7/55* | (2017.01) | |
| *G06T 7/73* | (2017.01) | |
| *G06F 16/58* | (2019.01) | |
| *G06K 9/00* | (2006.01) | |
| *G06T 3/40* | (2006.01) | |

(52) U.S. Cl.
CPC ............ *G06T 11/60* (2013.01); *G06F 16/583* (2019.01); *G06F 16/5866* (2019.01); *G06K 9/00664* (2013.01); *G06T 3/4038* (2013.01); *G06T 7/55* (2017.01); *G06T 7/74* (2017.01); *G06T 2200/24* (2013.01); *G06T 2207/20072* (2013.01)

(58) Field of Classification Search
CPC ..... G06T 7/55; G06T 3/4038; G06T 2200/24; G06T 2207/20072; G06F 16/583; G06F 16/5866; G06K 9/00664
See application file for complete search history.

(56) References Cited

U.S. PATENT DOCUMENTS

| | | | | |
|---|---|---|---|---|
| 8,447,136 B2 * | 5/2013 | Ofek | ......................... | G06T 5/50 382/113 |
| 2010/0023259 A1 * | 1/2010 | Krumm | ................... | G01C 21/20 701/532 |
| 2012/0219185 A1 | 8/2012 | Hu et al. | | |

OTHER PUBLICATIONS

Aurenhammer, "Voronoi Diagrams—A Survey of a Fundamental Geometric Data Structure", ACM Computing Surveys, vol. 23, Issue 3, New York, New York, Sep. 1991, pp. 345-405.

(Continued)

*Primary Examiner* — Edward Martello
(74) *Attorney, Agent, or Firm* — Dority & Manning, P.A.

(57) ABSTRACT

Provided are methods, systems, and devices for generating annotations in images that can include receiving image data including images associated with locations. The images can include key images comprising one or more key annotations located at one or more key annotation locations in the one or more key images. At least one image and a pair of the key images that satisfies one or more annotation criteria can be selected based in part on one or more spatial relationships of the plurality of locations associated with the images. An annotation location for an annotation in the image can be determined based in part on the one or more key annotation locations of the one or more key annotations in the pair of the key images that satisfies the one or more annotation criteria. An annotation can be generated at the annotation location of the image.

20 Claims, 14 Drawing Sheets

(56) References Cited

OTHER PUBLICATIONS

International Search Report and written Opinion for PCT/US2018/037523, dated Aug. 30, 2018, 22 pages.
Erwig, "The Graph Voronoi Diagram with Applications", Networks, vol. 36, No. 3, Oct. 2000, pp. 156-163.
Hartley et al., "Multiple View Geometry in Computer Vision", New York, Jan. 2004, 674 pages.

* cited by examiner

ANNOTATION GENERATION FOR AN IMAGE NETWORK

RELATED APPLICATION

The present application is based on and claims benefit of U.S. Provisional Patent Application No. 62/543,848 filed Aug. 10, 2017, which is incorporated by reference herein.

FIELD

The present disclosure relates generally to generating annotations for images displayed on computing devices.

BACKGROUND

Geographic information systems can capture a variety of data including images associated with geographic locations. The images can be used for various applications including mapping applications process images of specific geographic locations. Users of the mapping applications can manually associate various tags and other labels to identify the images. However, manual association of tags or labels with images can be laborious and prone to error. Furthermore, when applied to large datasets, manual association of tags with images may not be feasible due to time constraints. However, the quantity and complexity of image data continues to increase, as does the demand for more comprehensive information about areas depicted in a map. Accordingly, there exists a need for a way to more effectively process, manipulate, and modify images, thereby enhancing the user experience.

SUMMARY

Aspects and advantages of embodiments of the present disclosure will be set forth in part in the following description, or may be learned from the description, or may be learned through practice of the embodiments.

One example aspect of the present disclosure is directed to a method for generating annotations in images. The method can include, receiving, by a computing system comprising one or more computing devices, image data comprising a plurality of images associated with a plurality of locations. The plurality of images can comprise key images comprising one or more key annotations located at one or more key annotation locations in the one or more key images. The method can include, selecting, by the computing system, at least one image and a pair of the key images that satisfies one or more annotation criteria based in part on one or more spatial relationships of the plurality of locations associated with the plurality of images. The method can include, determining, by the computing system, an annotation location for an annotation in the at least one image based in part on the one or more key annotation locations of the one or more key annotations in the pair of the key images that satisfies the one or more annotation criteria. The method can also include, generating, by the one or more computing devices, an annotation at the annotation location of the at least one image.

Another example aspect of the present disclosure is directed to one or more tangible non-transitory computer-readable media storing computer-readable instructions that when executed by one or more processors cause the one or more processors to perform operations. The operations can include receiving image data comprising a plurality of images associated with a plurality of locations. The plurality of images can comprise key images comprising one or more key annotations located at one or more key annotation locations in the one or more key images. The operations can include, selecting at least one image and a pair of the key images that satisfies one or more annotation criteria based in part on one or more spatial relationships of the plurality of locations associated with the plurality of images. The operations can include, determining an annotation location for an annotation in the at least one image based in part on the one or more key annotation locations of the one or more key annotations in the pair of the key images that satisfies the one or more annotation criteria. The operations can also include, generating an annotation at the annotation location of the at least one image.

Another example aspect of the present disclosure is directed to a computing system comprising one or more processors, and one or more non-transitory computer-readable media storing instructions that when executed by the one or more processors cause the one or more processors to perform operations. The operations can include receiving image data comprising a plurality of images associated with a plurality of locations. The plurality of images can comprise key images comprising one or more key annotations located at one or more key annotation locations in the one or more key images. The operations can include, selecting at least one image and a pair of the key images that satisfies one or more annotation criteria based in part on one or more spatial relationships of the plurality of locations associated with the plurality of images. The operations can include, determining an annotation location for an annotation in the at least one image based in part on the one or more key annotation locations of the one or more key annotations in the pair of the key images that satisfies the one or more annotation criteria. The operations can also include, generating an annotation at the annotation location of the at least one image.

Other example aspects of the present disclosure are directed to other computer-implemented methods, systems, apparatus, tangible, non-transitory computer-readable media, user interfaces, memory devices, and electronic devices for generating annotations for images that can be displayed on a display device.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
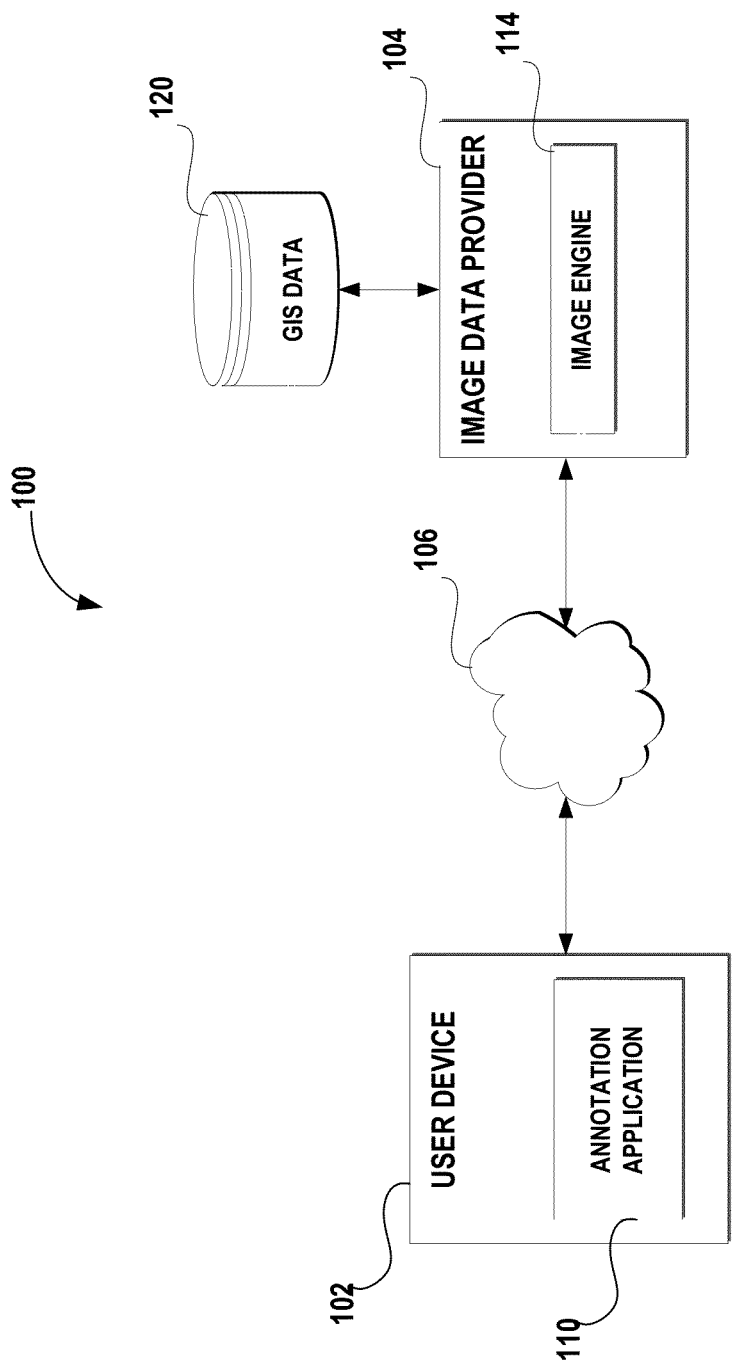
FIG. 1 depicts a diagram of an example system according to example embodiments of the present disclosure.

Example aspects of the present disclosure are directed to generating one or more annotations (e.g., graphical indicators or identifiers of points of interest) for one or more images (e.g., panoramic images in an image network comprising one or more images). The disclosed technology can receive data including image data that comprises, or is associated with, a plurality of images (e.g., images of locations including roads, streets, and/or buildings), select an image and a pair of key images that can be used to generate a new annotation, determine an annotation location for a new annotation based in part on the location of the pair of key images, and generate the new annotation at the annotation location. As such, the disclosed technology can more effectively generate annotations in images by reducing the need to manually place annotations in relevant locations (e.g., in proximity to features associated with the annotation) within an image. In particular, the disclosed technology can facilitate more efficient generation of new annotations by using the geometry of existing annotations to determine positions for the new annotations. Additionally, the disclosed technology can more rapidly generate key annotations by detecting one or more features of images.

By way of example, the disclosed technology can include a computing device that receives image data from a remote image data source (e.g., a server computing device that stores a repository of panoramic images). The image data can include a panoramic image network (i.e., a pano network) that includes a plurality of images (e.g., a sequence of images of a street) that are associated with a corresponding plurality of locations (e.g., a latitude and longitude for each of the plurality of images). Some of the plurality of images can include annotations (e.g., key annotations) that indicate places of interest including landmarks, businesses, schools, transportation hubs, and/or government offices. The computing device can select images without annotations and that satisfies a predetermined spatial relationship to the images that include annotations. The images without annotations can satisfy the predetermined spatial relationship by being associated with locations that are adjacent to the images with annotations. For example, sequential images corresponding to ten main street, twenty main street, and thirty main street, can include annotations at ten main street and thirty main street (e.g., manually created annotations). The disclosed technology can generate an annotation for twenty main street based on the location of the annotations at ten main street and thirty main street. The disclosed technology can generate epipolar lines for the images with annotations. Based on the point where epipolar lines converge, an epipole corresponding to a three-dimensional point can be generated. An annotation can then be generated in the image that did not previously have an annotation (e.g., twenty main street). In this way, the disclosed technology can generate annotations in an image without the need for manual intervention (e.g., hand placement of annotations).

The disclosed technology can include a computing system (e.g., an image computing system) that comprises one or more computing devices (e.g., devices with one or more computer processors and a memory that can store one or more instructions) that can exchange (send or receive), process, generate, or modify signals or data, including signals or data exchanged with various computing devices including remote computing devices that can provide data associated with, or including, one or more images, locations associated with the one or more images, or annotation data associated with annotations in the one or more images.

The image computing system can receive image data comprising a plurality of images (e.g., two-dimensional representations of locations) associated with a plurality of locations (e.g., a latitude and longitude or street address). For example, the plurality of images can include one or more digital images that represent an image (e.g., a two dimensional image). The plurality of images can include any combination of raster images (e.g., bitmaps comprising a grid of pixels) or vector images (e.g., polygonal representations of images based on positions of coordinates including x and y axes of a two-dimensional plane). Examples of digital image formats that can be included in the plurality of images include JPEG (Joint Photographic Experts Group), BMP (Bitmap), TIFF (Tagged Image File Format), PNG (Portable Network Graphics), or GIF (Graphics Interchange Format).

The plurality of images can include key images (e.g., images with one or more annotations, that can be used to determine the location of annotations for other images) that include one or more key annotations (e.g., a combination of a picture or text to indicate a place of interest) located at one or more key annotation locations (e.g., a set of coordinates that indicate the position of an annotation within an image) in the one or more key images. For example, an image of a street can include an annotation for a restaurant that is depicted within the image. The location of the annotation can be indicated by a set of x and y coordinates corresponding to the center of the annotation within the image.

In an implementation, the image computing system can determine a convergence distance between the epipolar lines (e.g., a distance between points on the different epipolar lines corresponding to respective images). In response to the determination that the convergence distance satisfies one or more convergence criteria (e.g., the distance is greater than a threshold convergence distance, or the epipolar lines diverge) a discontinuity can be determined to have occurred. The discontinuity can be formed by a set of images (e.g., key images) that cannot be used together to determine the position of an annotation in another set of images (e.g., images without annotations). The one or more annotation criteria can be based in part on the discontinuity not occurring. For example, when the image computing system selects a set of images comprising a pair of key images and an image to add an annotation to, the existence of a discontinuity in the set of images can be used to exclude that particular set of images (e.g., that specific combination of images) from having an annotation generated.

The image computing system can detect one or more visual features including shape, color (e.g., chrominance), brightness (e.g., luminance), and/or other image properties (e.g., ridges, edges, corners, curves, or blobs). For example, the one or more visual features associated with annotation locations can include a building entranceway, building signage, or a building address marker. The image computing system can determine the one or more key annotation locations of the one or more key annotations based in part on the location of the one or more visual features. For example, the image computing system can detect a restaurant logo (i.e., building signage) in an image and determine that the key annotation will be located directly above the restaurant logo. In this way, the one or more key annotations can be detected by the image computing system and not have to depend on manually selected key annotation locations.

The image computing system can select at least one image and a pair of the key images that satisfies one or more annotation criteria based in part on one or more spatial relationships of the plurality of locations associated with the plurality of images. The one or more spatial relationships can include one or more distances, orientations, relative positions, or adjacency relationships between the plurality of locations associated with the images. For example, the one or more annotation criteria can include a criteria that requires a set of the plurality of locations corresponding to the pair of key images to be within a minimum distance of the location associated with the image (i.e., the image for which a new annotation will be generated). Other examples of the one or more annotation criteria include a maximum distance requirement (e.g., a set of the plurality of locations cannot be further apart than the maximum distance); an orientation requirement (e.g., the locations are required to be facing in the same direction or have front facing sides oriented in the same direction); a relative position requirement (e.g., the locations are required to have a specified position relative to one another); and/or an adjacency requirement (e.g., the locations are required to be adjacent to one another).

The image computing system can determine an annotation location for an annotation in the image based in part on the one or more key annotation locations of the one or more key annotations in the pair of the key images that satisfies the one or more annotation criteria. Based on the one or more annotation criteria being satisfied, a range of available locations for the annotation in the image can be determined.

In an implementation, the annotation location for the annotation can be determined based on epipolar lines that were determined for the pair of key images. Determining the annotation location can include determining aspects of epipolar lines associated with the one or more key annotations of the pair of the key images. The aspects of the epipolar lines include a starting point, ending point, angle, or trajectory of the epipolar lines. The locations of the epipolar lines can be based in part on an optical center (e.g., a focal point of a camera that captures an image) of the pair of key images.

In response to the epipolar lines converging, the image computing system can determine an epipole for the pair of the key images. The epipole (e.g., epipolar point) is the point at which the epipolar lines converge. The epipole can correspond to a three-dimensional point in the geographical location that is associated with the image for which the annotation will be generated. The annotation location can be based in part on the location of the epipole. For example, the epipole can serve as a single point of reference for a pair of key images. Using the location of the epipole, a location for an annotation can be determined for an intermediate image between the pair of key images.

The image computing system can generate an annotation at the annotation location of the image. For example, the image computing system can send one or more instructions to modify the image data associated with the image. The modification to the image data associated with the image can include generating an additional image (e.g., an image with the annotation in the annotation location), adding the annotation to an existing image, or removing an annotation in an existing image and generating a new annotation in the image. Further, the annotation generated in the annotation location can be output to a display device (e.g., an LCD monitor).

The image computing system can generate a graph that is based in part on the plurality of images. The graph can be used to represent the relative position of the plurality of locations associated with the plurality of images. For example, the graph can include vertices that represent the plurality of images and edges that represent the closest traversable image of the plurality of images. The closest traversable image to an image at a vertex can be, but is not necessarily associated with, another image that is associated with a location that is closest in proximity to the location associated with the image at the vertex. For example, the first node corresponding to an image associated with the location of a first entrance of a building can be adjacent to a second node corresponding to an image associated with the location of a second entrance on the same side of the street that is further away than a third node corresponding to an image associated with the location of a third entrance on the other side of the street.

In another implementation, the graph can include a plurality of nodes corresponding to the plurality of images (e.g., each of the nodes of the graph can represent one of the plurality of images). The locations (e.g., relative locations) of the plurality of nodes can be based in part on the plurality of locations associated with the plurality of images. At least one of the one or more annotation criteria can be based in part on a pair of the nodes corresponding to the pair of the key images that is adjacent to a node corresponding to the image.

Furthermore, the image computing system can generate a representation of the nodes in the graph or the plurality of images, that includes a plurality of areas associated with the plurality of locations. Each of the plurality of areas can be associated with a node and can be separated by one or more partitions that are based in part on a distance between a set of the plurality of locations. The one or more spatial relationships can be based in part on a shape or size of the plurality of areas. Further, the shape and size of the one or more partitions can be based on a weighting that is applied to each of the nodes. In this way, for example, a Voronoi type diagram can be generated to represent the plurality of images associated with the nodes in the graph.

In some implementations, the generation of the plurality of areas can include adding an additional area to the plurality of areas. The additional area can correspond to an additional image added to the plurality of images. The location of the additional area (e.g., the location of the additional area within the plurality of areas) can be based in part on a location associated with the additional image. The image computing system can modify the locations of the one or more partitions based in part on a location of the additional location relative to the plurality of locations. For example, introducing an additional area to a plurality of areas can include creation of a new partition when the additional area is adjacent to at least one of the plurality of areas.

The image computing system can receive annotation update data that includes a location for an annotation in an image. For example, the annotation update data can include a set of coordinates (e.g., x and y coordinates) of a location within an image. The annotation update data can be received from various devices including a remote computing system (e.g., a remote server computing device that maintains and provides annotation update data) and/or an input device including a human input device (e.g., a keyboard, mouse, touch screen, and/or microphone). Based in part on the annotation data, the annotation location can be modified. For example, a user can use an application that is part of the image computing device that allows for the creation, modification, or removal of one or more annotations in an image. The user can output the visual representation of the image onto a display device and create an annotation through a user interface of the application. In this way, the disclosed technology can facilitate manual adjustment of annotations by a user.

The systems, methods, devices, and non-transitory computer-readable media in the disclosed technology can provide a variety of technical effects and benefits to the overall generation of annotations in images. By performing the generation of annotations automatically, the disclosed technology can reduce or eliminate the need for manual selection of locations within an image to place an annotation. In situations in which manual selection is still used, the disclosed technology can reduce the amount of human intervention by generating annotations that are based on a smaller number of key images to which annotations were manually added. Further, the placement of an annotation within a smaller number of images can be used to generate annotations in a larger set of images.

Some of the implementations of the disclosed technology can maximize the use of computing resources by using efficient calculation of epipoles in key images with key annotations to determine locations for images that do not have annotations, or that have annotations that will be relocated or removed. Additionally, the disclosed technology improves the transference of annotations to new images of the same location. In, this way redundant work (e.g., generating new annotations for every new image set) can be reduced.

Furthermore, the annotations generated using the disclosed technology can correspond to a three-dimensional location. Accordingly, the annotations can be projected onto different types of images including augmented reality images and virtual reality images.

Accordingly, the disclosed technology provides more effective generation of annotations for a variety of image types along with benefits resulting from lower resource usage to generate the annotations, and greater reuse of existing annotations in novel images or applications.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

With reference now to the FIGS. 1-15, example aspects of the present disclosure will be disclosed in greater detail. FIG. 1 depicts an overview of an example system 100 for processing annotations according to example embodiments of the present disclosure. The system 100 can include a user device 102; image data provider 104; a communication network 106; an annotation application 110 (e.g., a software application); an image engine 114; and a geographic information system 120.

The user device 102 can receive navigation data from the image data provider 104 via a communication network 106. The annotation application 110, which can operate or be executed on the user device 102, can interact with the image engine 114 via the network 106. The network 106 can include any type of communications network, such as a local area network (e.g. intranet), wide area network (e.g. Internet), cellular network, or some combination thereof. The network 106 can also include a direct connection. In general, communication can be carried via network 106 using any type of wired and/or wireless connection, using a variety of communication protocols (e.g. TCP/IP, HTTP, SMTP, FTP), encodings or formats (e.g. HTML or XML), and/or protection schemes (e.g. VPN, secure HTTP, or SSL).

The user device 102 can include one or more computing devices including a tablet computing device, a wearable device (e.g., a smart watch or a smart band), a laptop computing device, a desktop computing device, a mobile computing device (e.g., a smartphone), a wearable computing device, and/or a display device with one or more processors.

The annotation application 110 can be implemented on the user device 102. The annotation application 110 can implement an imaging service for model data and/or image data to a user. The model data can be based on the state a plurality of images and data associated with the plurality of images including the location of annotations within the images and the locations associated with the plurality of images. The annotation application 110 can be operated or executed locally on the user device 102, through a web application accessed via a web browser implemented on the user device 102, or through a combination of local execution or operation on user device 102 and remote execution or operation on a remote computing device which can include the image data provider 104 or the geographic information system 120.

The annotation application 110 can be configured to generate, process, or modify data including image data (e.g., image files) or navigational data (e.g., the location of places of interest associated with the image data) that can be used by a user. In some implementations, the annotation application 110 can include a graphical user interface component for presenting the navigation information to the user on one or more display devices.

The image engine 114 can be configured to, for instance, receive image data, receive input from a user device to modify portions of the image data, determine the position of annotations within an unannotated image, and/or respond to requests for model data or image data from the annotation application 110.

In some embodiments, the image data provider 104 can include one or more computing devices including servers (e.g., web servers). The one or more computing devices can include one or more processors and one or more memory devices. The one or more memory devices can store computer-readable instruction to implement, for example, the image engine 114. In some embodiments, the image engine 114 can access data associated, for instance, with a geographic information system 118.

The geographic information system 118 can be associated with or include data that is indexed according to geographic coordinates (e.g., latitude and longitude) of its constituent elements (e.g., locations). The data associated with the geographic information system 118 can include map data, image data, geographic imagery, and/or data associated with various waypoints (e.g., addresses or geographic coordinates). The model data or image data as determined or generated by the image data provider 104 can be provided to the annotation application 110 via an application programming interface that includes extensions for use with an image service (e.g., extensions to a user interface for interacting with or modifying images associated with locations). In some implementations, the annotation application 110 can present the image data within the user interface of the annotation application 110.

Figure 2:
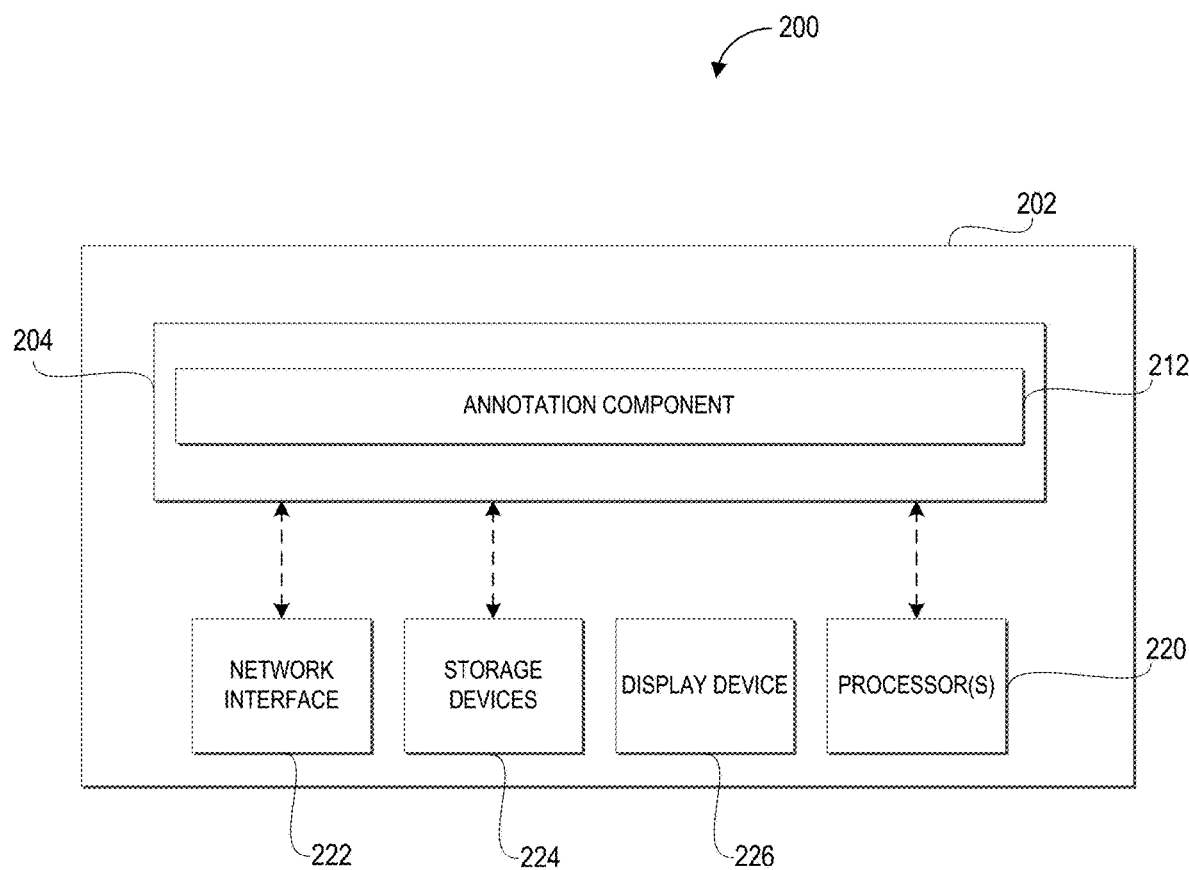
FIG. 2 depicts a diagram of an example device according to example embodiments of the present disclosure.

FIG. 2 depicts an example user device 202 configured to implement an annotation component according to example embodiments of the present disclosure. As shown, the user device 202 an include a memory 204; an annotation component 212 that can include one or more instructions that can be stored on the memory 204; one or more processors 220 configured to execute the one or more instructions stored in the memory 204; a network interface 222 that can support network communications; a storage device 224 (e.g., a hard disk drive or a solid state drive); and/or a display device 226. The one or more processors 220 can include any processing device that can, for example, process and/or exchange (send or receive) one or more signals or data associated with a computing device.

For example, the one or more processors 220 can include single or multiple core devices including a microprocessor, microcontroller, integrated circuit, and/or logic device. The memory 204 and the storage memory 224 are illustrated separately, however, the components 204 and 224 can be regions within the same memory module. The user device 202 can include one or more additional processors, memory devices, network interfaces, which may be provided separately or on a same chip or board. The components 204 and 224 can include one or more computer-readable media, including, but not limited to, non-transitory computer-readable media, RAM, ROM, hard drives, flash drives, and/or other memory devices.

The memory 204 can store sets of instructions for applications including an operating system that can be associated with various software applications or data. The memory 204 can be used to operate various applications including a mobile operating system developed specifically for mobile devices. As such, the memory 204 can perform functions that allow the software applications to access data including wireless network parameters (e.g., identity of the wireless network, quality of service), and invoke various services including telephony, location determination (e.g., via global positioning service (GPS) or WLAN), and/or wireless network data call origination services. In other implementations, the memory 204 can be used to operate or execute a general-purpose operating system that operates on both mobile and stationary devices, such as smartphones and desktop computers, for example. In some example implementations, the operating system includes or based upon an Android® mobile operating system developed by Google Inc. or other operating system to implement an Android operating platform.

The software applications that can be operated or executed by the user device 202 can include the annotation application 110 shown in FIG. 1. Further, the software applications that can be operated or executed by the user device 202 can include native applications or web-based applications.

In some implementations, the user device can be associated with or include a positioning system (not shown). The positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position. The positioning system can determine a user location of the user device. The user location can be provided to the image data provider 104 for use by the navigation data provider in determining travel data associated with the user device 102.

Figure 3:
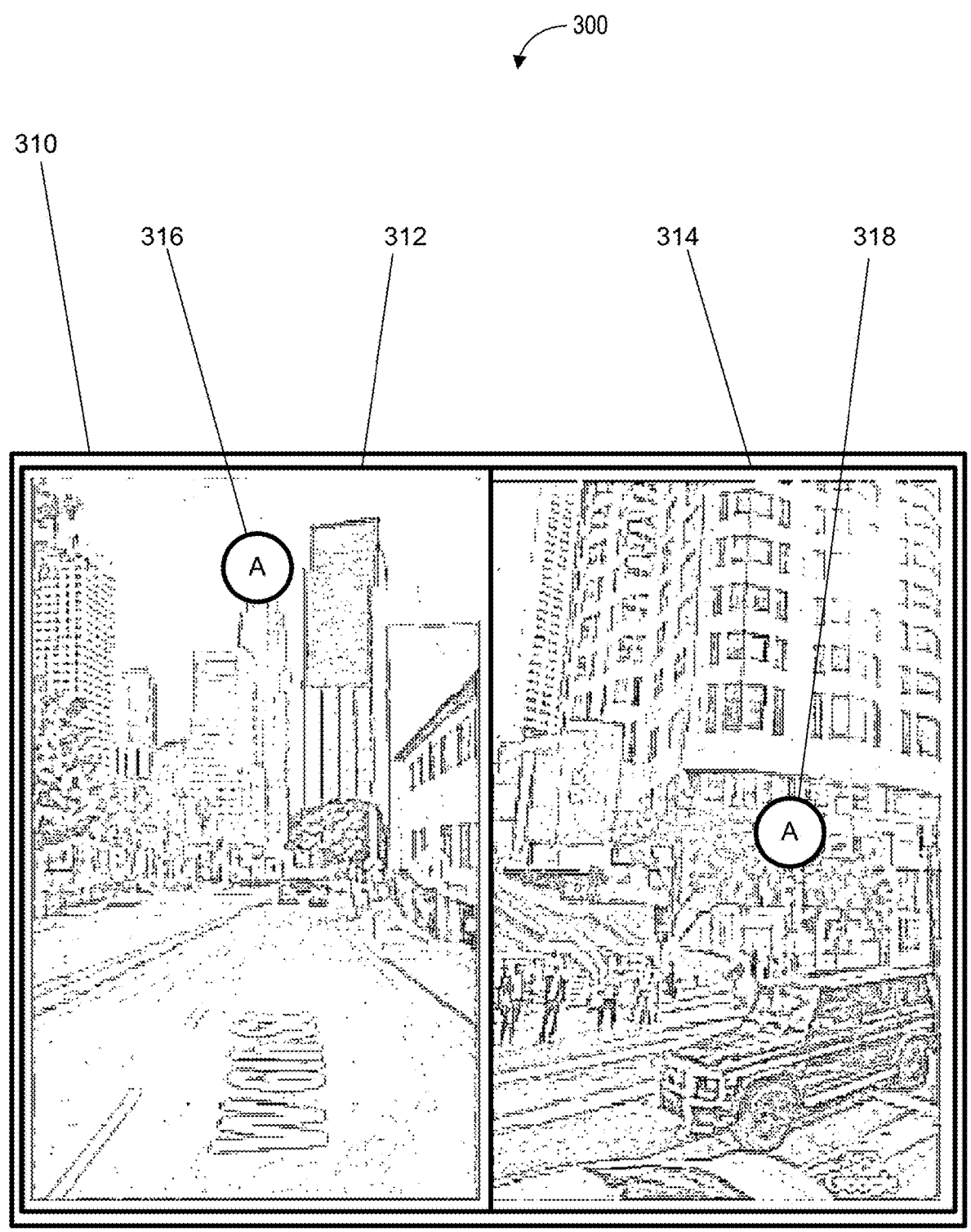
FIG. 3 depicts an example of generating an annotation location at different locations according to example embodiments of the present disclosure.

FIG. 3 depicts an example of modeling an annotation location at different locations according to example embodiments of the present disclosure. FIG. 3 includes an illustration of a computing system 300 that includes a graphical user interface component 310. The graphical user interface component 310 can be displayed on a display device of a computing system (e.g., a display device of the user device 102). The graphical user interface component 310 can include various interface elements that can be used to access, generate, process, or present (e.g., display) data, including geographical data, to a user as part of an image viewing system that can display images associated with the geographical data. As shown in FIG. 3, the graphical user interface component 310 includes a display portion 312/314; and an annotation 316/318.

The display portion 312 and the display portion 314 can display images of an environment captured by an image acquisition device (e.g., a camera) from different perspectives (i.e., the images associated with display portion 312 and display portion 314 show the environment from a different distance and angle). The display portion 312 depicts a building in an urban environment captured by the image acquisition device. The building associated with the display portion 312 is identified as a place of interest by the annotation 316. For example, the annotation 316 can indicate that the display portion 312 includes a representation of a commercial location (e.g., a bank) that could be of interest to a viewer.

The display portion 314 includes a building image that represents the same building, captured from a different perspective, as the building depicted in the display portion 312. The building associated with the display portion 314 is identified as a place of interest by the annotation 318. The position of the annotation 316 is in an elevated position, relative to the ground, that is visible from the long range perspective shown in display portion 312. In the display portion 314, the annotation 318 is in a lower position, relative to the ground, that is visible from the closer range perspective shown in display portion 314. As illustrated in FIG. 3, the disclosed technology can modify the location of an annotation associated with the same place of interest in the same location so that it is visible from multiple perspectives in different images.

Figure 4:
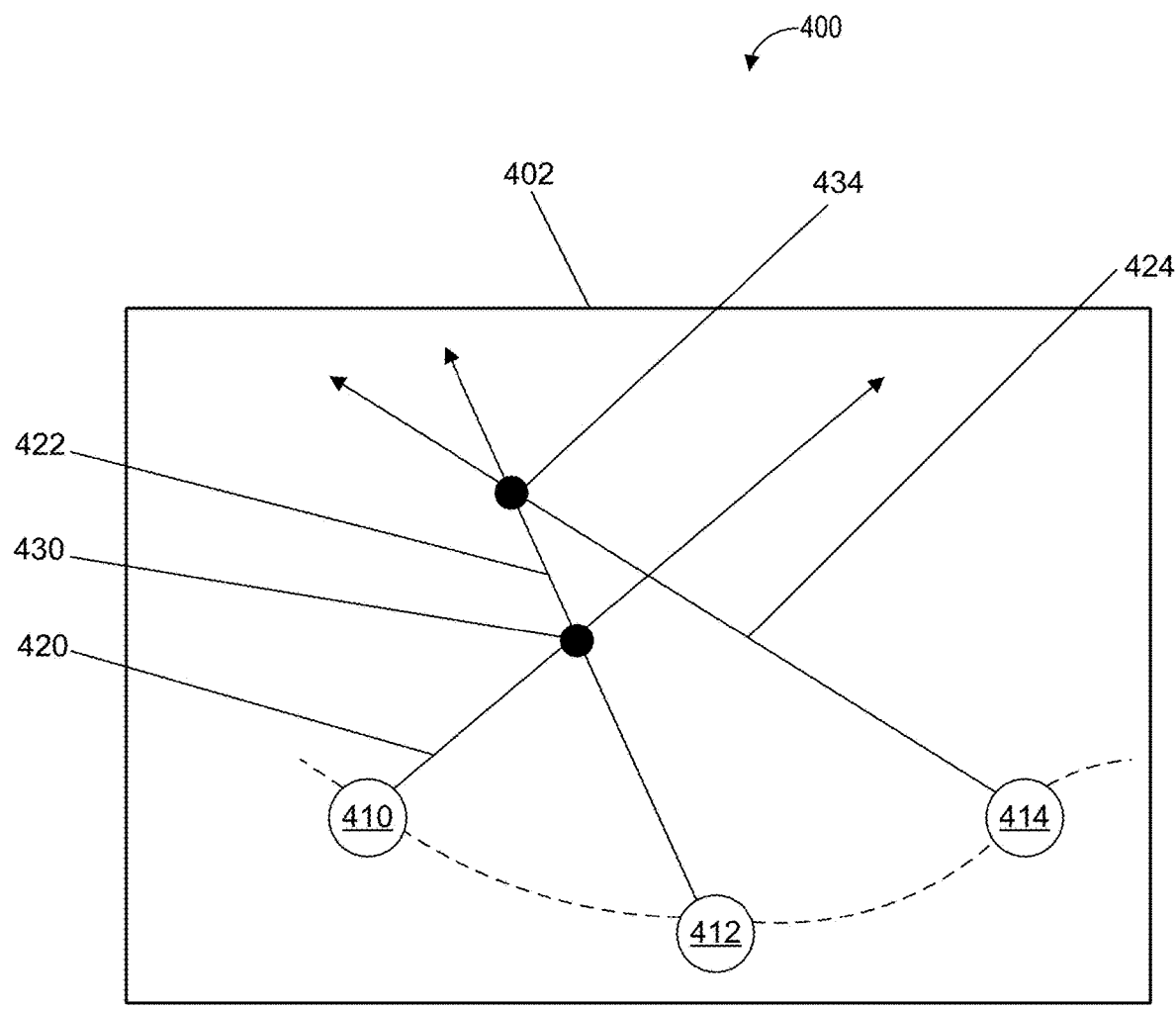
FIG. 4 depicts an example of generating an epipolar graph for an image network according to example embodiments of the present disclosure.

FIG. 4 depicts an example of generating an epipolar graph for an image network according to example embodiments of the present disclosure. FIG. 4 includes an illustration of a computing system 400 that can generate a graph 402 associated with a plurality of images. One or more of the instructions stored on the computing system 400 can be executed or implemented on one or more computing devices or computing systems including, for example, the user device 102, the image data provider 104, and/or the computing device 202. Further, one or more of the instructions stored on the computing system 400 can be executed or implemented as an algorithm on the hardware components of the devices disclosed herein. As shown, graph 402 can include an image node 410/412/414; an epipolar line 420/422/424; and an epipole 430/434.

The graph 402 includes the image node 410/412/414 that is associated with a plurality of images (e.g., a traversable panoramic image or pano network) that correspond to a plurality of locations at which each of the plurality of images was captured. The image node 410/412/414 is represented as a vertex of the graph 402 with an edge that can represent the closest traversable images of the plurality of images associated with other nodes (i.e., vertices of the graph 402).

In some implementations, annotations (e.g., markers or identifiers associated with an area of interest corresponding to a location depicted in an image) can be generated from the perspective of a specific image. Images with annotation positions that can be used to interpolate or determine the position of other annotations can be referred to as key images.

An annotation position in a key image (e.g., a key image associated with the image node 410) can be modeled as an epipolar line. An epipole corresponding to a three-dimensional point can be determined (e.g., calculated or computed) at the location where multiple epipolar lines converge or intersect (e.g., epipole 430 at the point where the epipolar line 420 and the epipolar line 422 converge).

For an annotation that is keyed across multiple images, an epipole can be determined for every sequential key image pair. In an implementation, the determination of an epipole can be limited to key image pairs that are not sequential (e.g., key image pairs corresponding to image nodes that are not sequential). For example, for image node 410 and 412, the epipole is epipole 430; and for image node 412 and image node 414 the epipole is epipole 434, however image node 410 and image node 414 are not sequential (e.g., the vertices are not adjacent) and so no epipole would be determined for image node 410 and image node 414 when a restriction on image nodes being sequential is applied.

Figure 5:
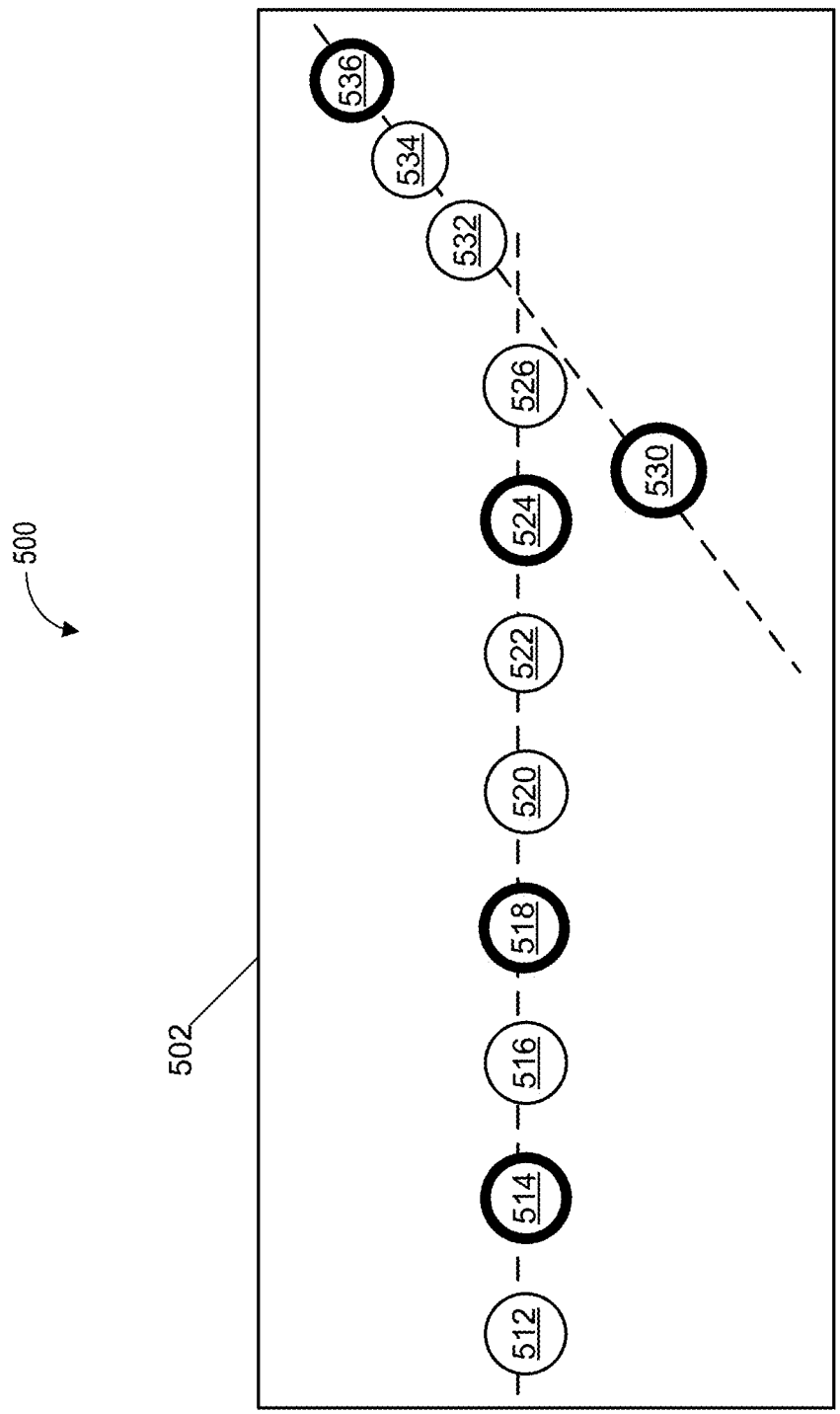
FIG. 5 depicts an example of generating an epipolar graph for an image network according to example embodiments of the present disclosure.

FIG. 5 depicts an example of generating an epipolar graph for an image network according to example embodiments of the present disclosure. FIG. 5 includes an illustration of a computing system 500 that can generate a graph 502 associated with a plurality of images. One or more of the instructions stored on the computing system 500 can be executed or implemented on one or more computing devices or computing systems including, for example, the user device 102, the image data provider 104, and/or the computing device 202. Further, one or more of the instructions stored on the computing system 500 can be executed or implemented as an algorithm on the hardware components of the devices disclosed herein. As shown, graph 502 can include a node 512; a key image node 514; a node 516; a key image node 518; a node 520; a node 522; a key image node 524; a node 526; a key image node 530; a node 532; a node 534; and a key image node 536.

The graph 502 represents a branching one-dimensional image network that includes points or nodes and is based on a plurality of images associated with a plurality of locations. The computing system 500 determines (e.g., computes based on image data) a three-dimensional annotation position for some point (e.g., an annotation position node) along the one-dimensional image network. The three-dimensional annotation position can be determined based on the neighboring midpoints) between adjacent key images (e.g., points between adjacent key images including points that are closer to one of the adjacent key images than the other adjacent key image.

In an implementation, when a point (along the one-dimensional image network) falls outside of a pair of key image midpoints, the annotation position (corresponding to the annotation position node) is the closest epipole. For example, annotation position node 512 falls outside of a midpoint pair, accordingly the annotation position is node 516 that is between (e.g., midway between) key image node 514 and the key image node 518.

In an alternative implementation, when an annotation position falls between the midpoints of sequential midpoints, the annotation position is computed as the interpolation between the epipoles. For example, the node 520 falls between midpoints that include the node 516 and the node 522. Accordingly, the annotation position of node 520 is based on the position of the node 516 and the network distance from the node 516 to the node 522. The network distance can be normalized to 1 at the node 522 and to 0.5 at node 518.

When a side of a point along the network branches, the annotation position can be based on the shortest distance to a key image node between either branch of the network. For example, between branches to the node 530 and the node 536, the node 536 is closest to the node 524, and can use the neighboring midpoints at the node 522 and the node 532 in determining the annotation position at the node 526. The node 534 falls outside of the midrange interval, so the closest epipole can be at the node 532.

Figure 6:
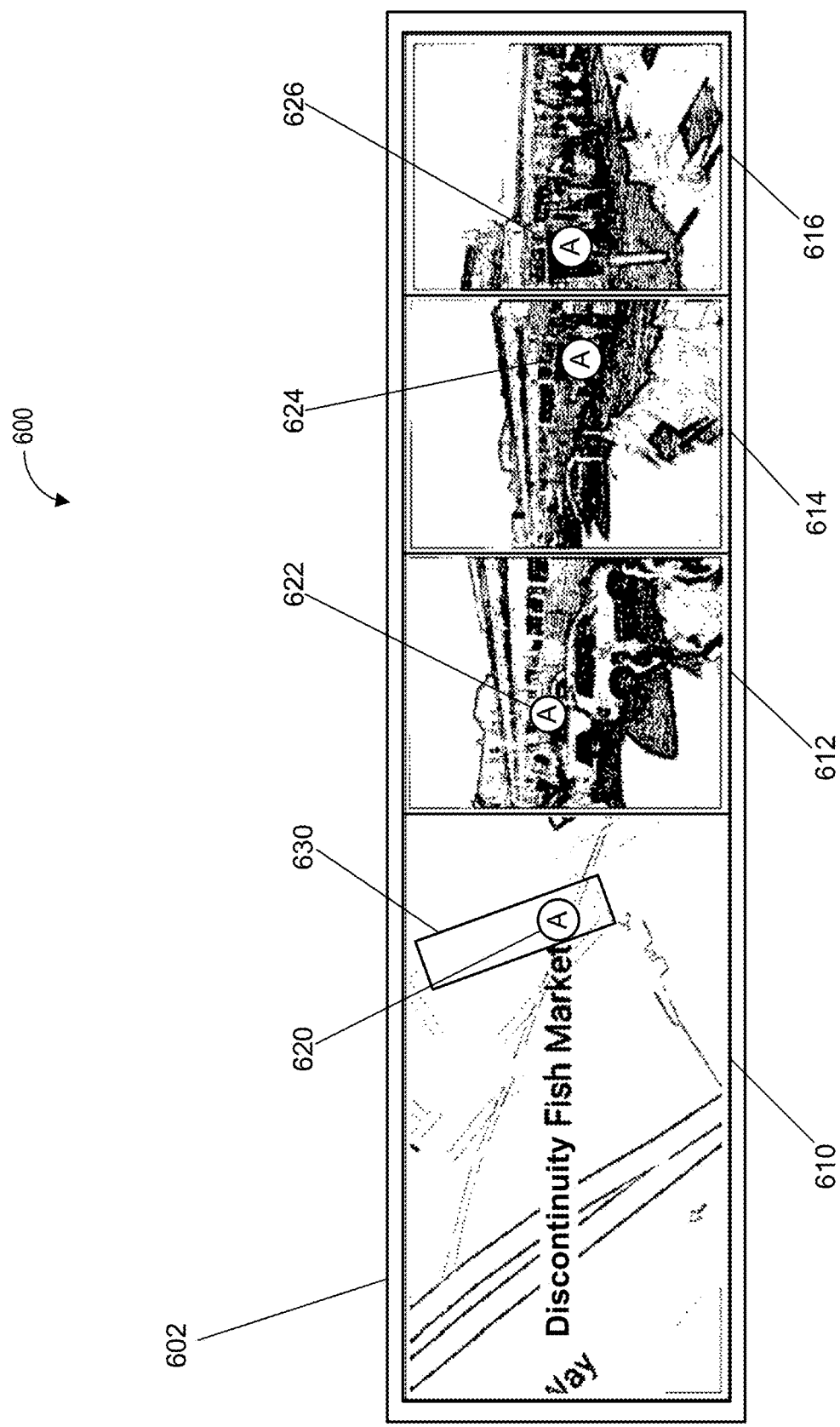
FIG. 6 depicts an example of generating an annotation at multiple entrances of a location according to example embodiments of the present disclosure.

FIG. 6 depicts an example of generating an annotation at multiple entrances of a location according to example embodiments of the present disclosure. FIG. 6 includes an illustration of a computing system 600 that can generate a graphical interface component 602 that can generate a plurality of images. The display output can be based on one or more instructions stored on a computing system that can be executed or implemented on one or more computing devices or computing systems including, for example, the user device 102, the image data provider 104, and/or the computing device 202. As shown, the graphical interface component 602 can generate an image 610/612/614/616; an annotation 620/622/624/626; and a building 630.

Image 610 depicts an top view of a location that includes a building 630 element ("Discontinuity Fish Market") that is associated with an annotation 620. The building 630 depicts a long structure with multiple entrances and can be associated with a single annotation 620 to denote the building 630 as a single point of interest when depicted from a top view.

The image 612/614/616 depicts ground level images of the building 630 captured from different vantage points (e.g., locations from which the images were captured). As shown, each of the image 612/614/616 includes entrances that are associated with the annotation 622/624/626 respectively. Because the entrances associated with the annotation 622/624/626 can be on different sides (i.e., distinct locations) of the building 630 the introduction of a discontinuity (i.e., a spatially distinct area including a set of nodes) in the graph can avoid interpolating intermediate annotation positions between key images (e.g., image 612/614/616).

Accordingly, when a key image is associated with a location that is distinct (i.e., does not satisfy one or more criteria to be treated as a neighboring node in an image network graph) from its neighbors (e.g., the different entrances associated with the annotation 622/624/626) a discontinuity can be modeled in the interpolation graph.

Figure 7:
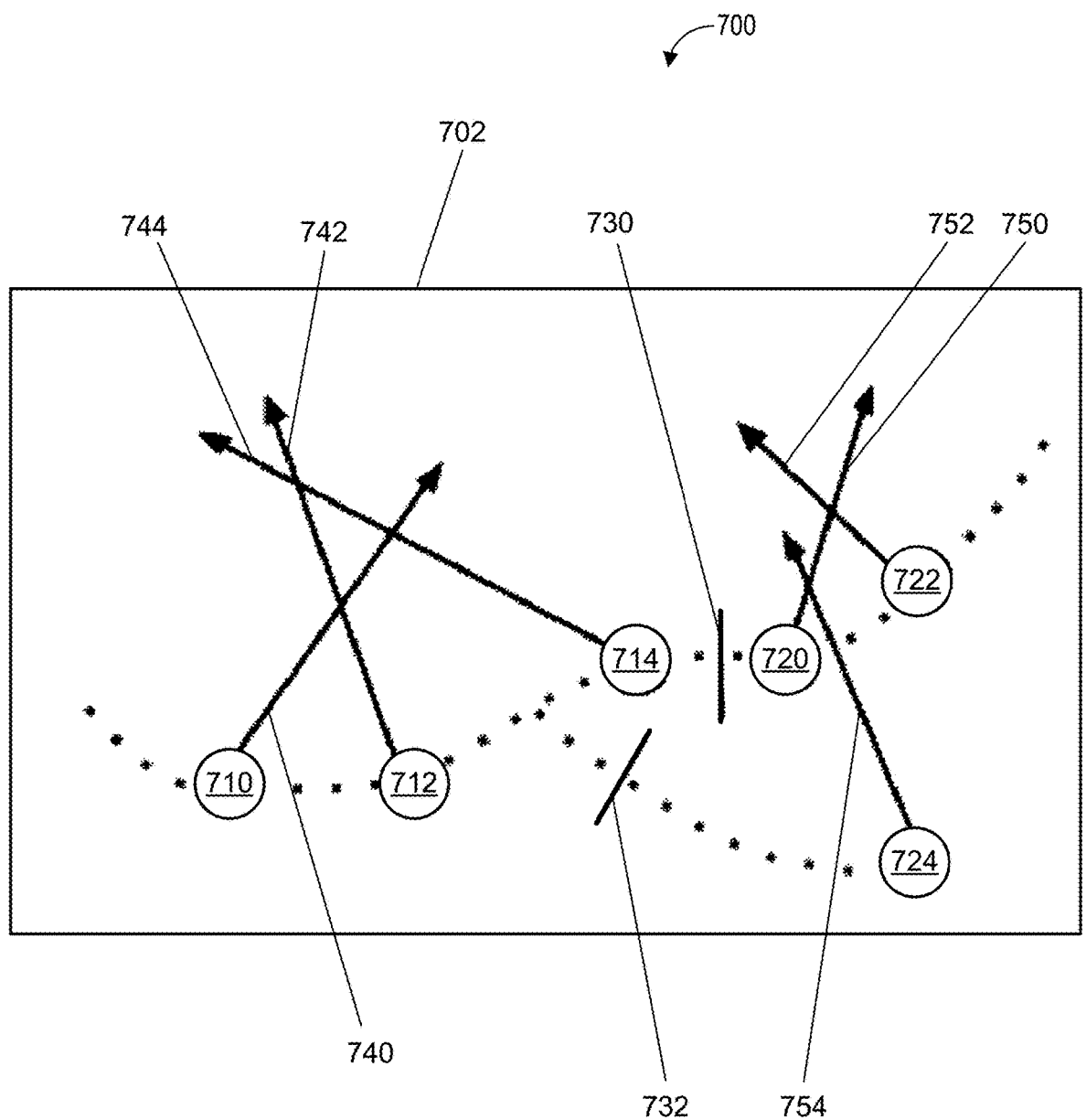
FIG. 7 depicts an example of generating an epipolar graph with discontinuities for an image network according to example embodiments of the present disclosure.

FIG. 7 depicts an example of generating an epipolar graph with discontinuities for an image network according to example embodiments of the present disclosure. FIG. 7 includes an illustration of a computing system 700 that can generate a graph 702 that is associated with a plurality of images according to example embodiments of the present disclosure. The graph 702 can be based on one or more instructions stored on a computing system that can be executed or implemented on one or more computing devices or computing systems including, for example, the user device 102, the image data provider 104, and/or the computing device 202. As shown, graph 702 can include an image node 710/712/714; an image node 720/722/724; a discontinuity 730; a discontinuity 732; epipolar line 740/742/744; and epipolar line 750/752/754.

The image node 710/712/714 is associated with the epipolar line 740/742/744 respectively. As shown, when an epipole does not converge in the image plane (i.e., the epipolar lines diverge) then the associated image nodes can be modeled as distinct points, which is illustrated by the discontinuity 730 that separates the image node 714 from the image node 714 that is adjacent to image node 720 in the graph 702.

When epipolar lines converge, discontinuities in epipole distance (e.g., an epipole distance that exceeds an epipole distance threshold) can indicate that the image keys model are distinct (i.e., discontinuous) points. For example, the epipolar line 742 and the epipolar line 754 will converge at a point (i.e., the epipole) that is far from the convergence point (i.e., the epipole) for epipolar line 740 and the epipolar line 742 and the convergence point for epipolar line 742 and the epipolar line 744.

In an implementation, points along image nodes associated with a discontinuity can be interpolated, such that the annotation position is that of the closest epipole.

Figure 8:
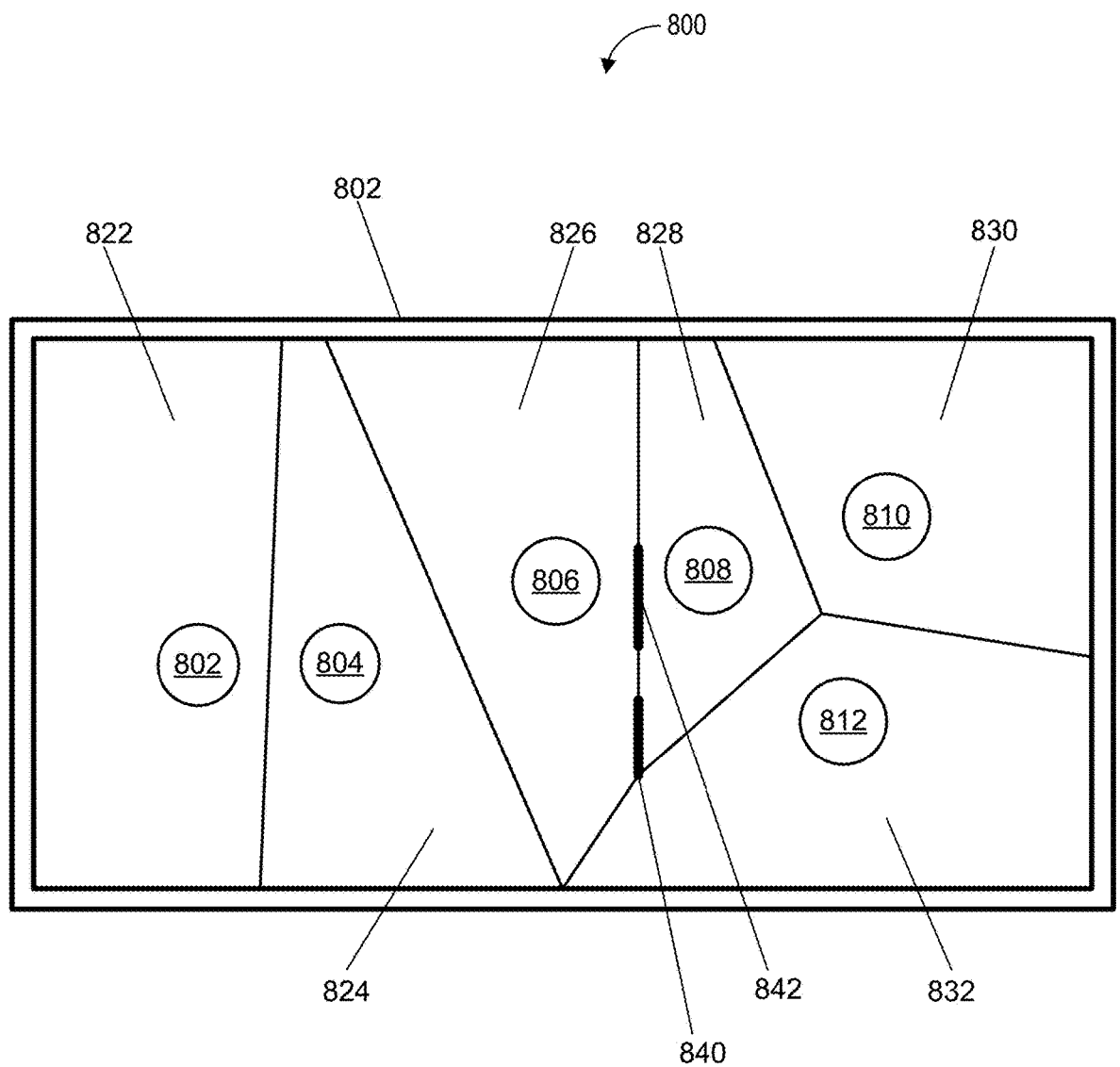
FIG. 8 depicts an example of generating a Voronoi graph for an image network according to example embodiments of the present disclosure.

FIG. 8 depicts an example of generating a Voronoi graph for an image network according to example embodiments of the present disclosure. FIG. 8 includes an illustration of a computing system 800 that can generate a graph 802 associated with a plurality of images by a computing system according to example embodiments of the present disclosure. One or more of the instructions stored on the computing system 800 can be executed or implemented on one or more computing devices or computing systems including, for example, the user device 102, the image data provider 104, and/or the computing device 202. Further, one or more of the instructions stored on the computing system 800 can be executed or implemented as an algorithm on the hardware components of the devices disclosed herein. As shown, graph 802 can include a node 802/804/806/808/810/812; a region 822/824/826/828/830/832; a discontinuity 840; and a discontinuity 842.

In an implementation a key point including the node 802/804/806/808/810/812 can be associated with an area or region surrounding the key point including the region 822/824/826/828/830/832 respectively. The area or region associated with the key point can be represented as a diagram in which the areas or regions are partitioned based on the key points. For example, the areas or regions can be represented as a Voronoi diagram.

The areas or regions associated with the key points can be determined through interpolation (e.g., natural neighbor interpolation). Points along the edges of an image network (e.g., a sequence of images) can preserve the neighbor-weights of previous edge-restricted interpolation, with the exception of discontinuities which can be weighted as zero ("0").

For example, natural neighbor interpolation for points in the region 826 that surrounds the node 806 can have contributions from the node 808 and the node 812. The interpolation network can indicate that the region 828 and the region 832 are discontinuous with the node 806, accordingly their contributions are weighted at zero ("0"). In an alternative implementation, the contribution from a discontinuous region can be a non-zero value that has a minimal contribution to the interpolation.

Figure 9:
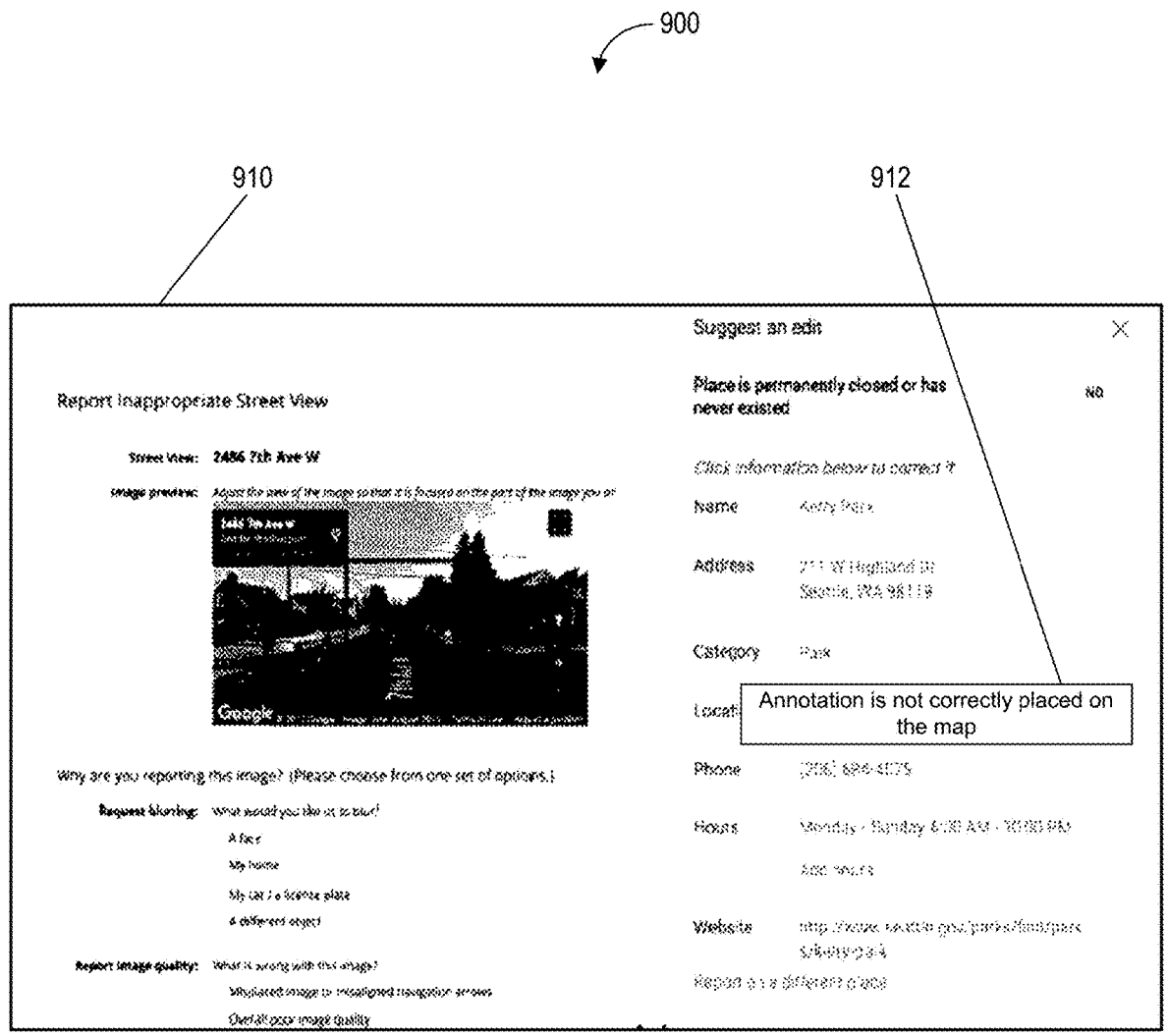
FIG. 9 depicts an example of a user interface including dialogs for issue reporting according to example embodiments of the present disclosure.

FIG. 9 depicts an example of a user interface including dialogs for issue reporting according to example embodiments of the present disclosure. FIG. 9 includes an illustration of a computing system 900 that can generate a graphical user interface component 910 according to example embodiments of the present disclosure. The graphical user interface component 910 can be displayed on a display device of a computing system (e.g., a display device of the user device 102). The graphical user interface component 910 can include various interface elements that can be used to access, generate, process, or present (e.g., display) data, including geographical data, to a user as part of an image viewing system that can display images associated with the geographical data. As shown in FIG. 9, the graphical user interface component 910 includes a control element 912 ("Annotation is not correctly placed on the map").

The graphical user interface component 910 can include a variety of elements to access or input information or data to the computing system 900. For example, a control element 912 can receive user feedback to indicate that an annotation is not correctly located or positioned (e.g., the annotation is not located within a threshold distance of the location associated with the annotation).

In an implementation, a user can modify or edit the position of an annotation in an image that is being displayed (e.g., a panoramic image). For example, a user can, upon receiving authorization to edit the location of the annotation, reposition the annotation to more appropriately identify the place of interest associated with the annotation.

Figure 10:
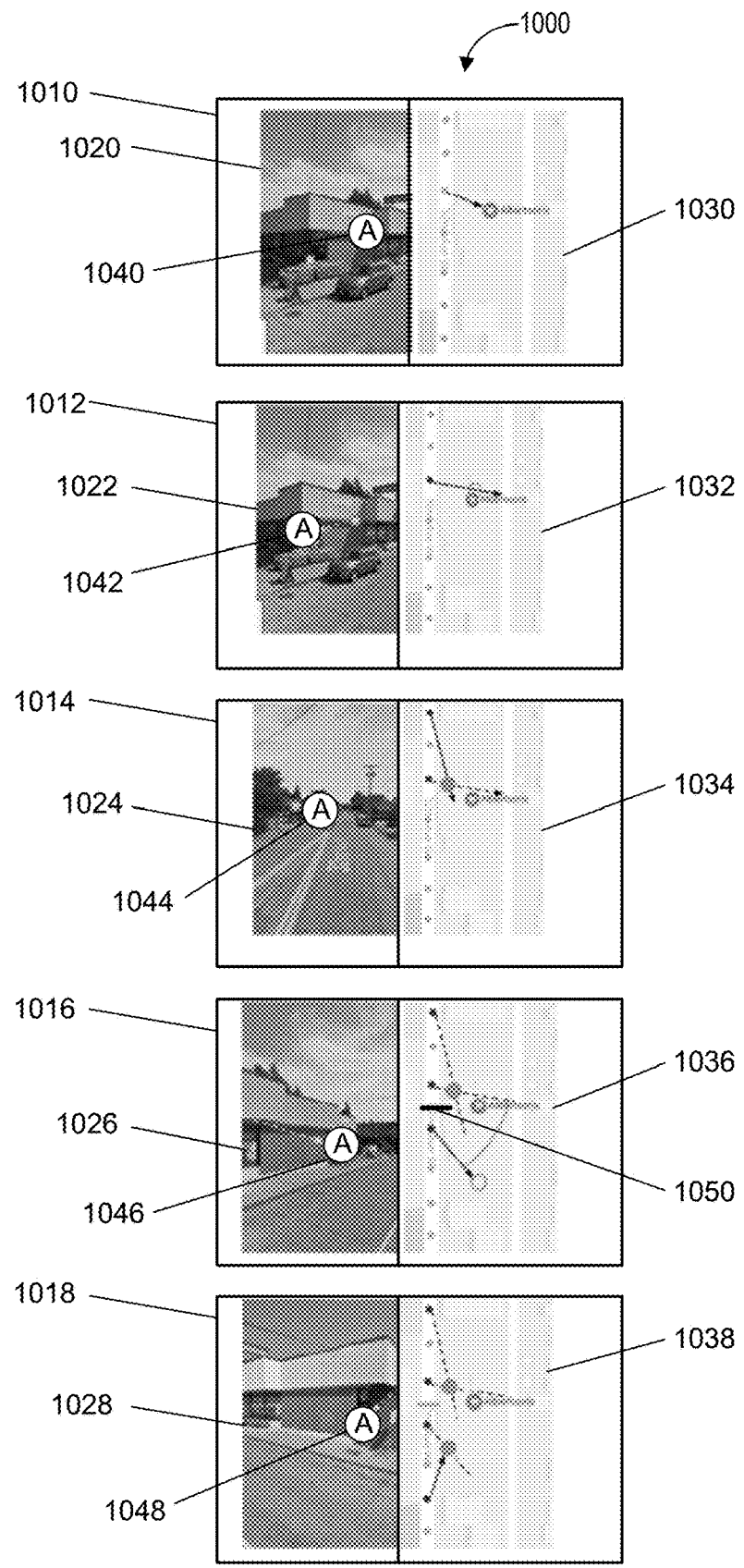
FIG. 10 depicts an example of interactive editing of a sequence of annotations according to example embodiments of the present disclosure.

FIG. 10 depicts an example of interactive editing of a sequence of annotations according to example embodiments of the present disclosure. FIG. 10 illustrates interactive editing using a graphical user interface component 1000 over a sequence of time intervals. The graphical user interface component 1000 can be displayed on a display device of a computing system (e.g., a display device of the user device 102). The graphical user interface component 1000 can include various interface elements that can be used to access, generate, process, or present (e.g., display) data, including geographical data, to a user as part of an image viewing system that can display images associated with the geographical data.

The graphical user interface component 1000 is shown over sequential time intervals including a time interval 1010 (the first time interval); a time interval 1012 (the second time interval); a time interval 1014 (the third time interval); a time interval 1016 (the fourth time interval); a time interval 1018 (the fifth interval); an image display portion 1020 (at the first time interval); an image display portion 1022 (at the second time interval); an image display portion 1024 (at the third time interval); an image display portion 1026 (at the fourth time interval); image display portion 1028 (at the fifth time interval); a map display portion 1030 (at the first time interval); a map display portion 1032 (at the second time interval); a map display portion 1034 (at the third time interval); a map display portion 1036 (at the fourth time interval); a map display portion 1038 (at the fifth time interval); an annotation 1040 (at the first time interval); an annotation 1042 (at the second time interval); an annotation 1044 (at the third time interval); an annotation 1046 (at the fourth time interval); an annotation 1048 (at the fifth time interval); and a discontinuity 1050.

The graphical user interface component 10000 can be controlled or interacted with via various inputs that can be performed by a user to manipulate various elements displayed on the graphical user interface component 1000. For example, an annotation (e.g., the annotation 1040) can be dragged via a pointing device (e.g., a mouse or stylus) from one location within the image display portion 1020 to a different location within the image display portion 1020. Further, using a touch interface of the graphical user interface component 1000 (e.g., a touch screen of a mobile computing device including a smartphone or tablet computing device), a user can pan around the image displayed in the image display portion (e.g., the image display portion 1020) so that the center of the screen aligns with an annotation. Accordingly, when an adjustment is made in an image displayed corresponding to the image displayed in the display portion of the graphical user interface component 1000, the corresponding image in the plurality of images of the interpolation network is updated to include the new key image based on the user modified annotation position. In an implementation, the changes to the annotation position of an annotation can be performed in real-time.

At time interval 1010, an annotation 1040 located near the right edge of the image display portion 1020 is identified as being in an incorrect location. The correct location is nearer to the left edge of the image display portion 1020. The map display portion 1030 indicates an overhead view of the location associated with the image display portion 1020.

At 1012, after a user interaction at time interval 1010 (e.g., selecting the annotation 1040 and dragging it to the correct location within the image display portion 1020) the annotation 1042 is shown at the updated location near the left edge of the image display portion 1022. The graphical user interface component 1000 can exchange data with an associated computing system to indicate the updated location of the annotation 1042 and an epipolar line associated with the annotation 1042.

At 1014, another edit is made to the location of annotation 1044 in the image display portion 1014 which shows an image of a different location from the location shown at time interval 1010 and time interval 1012. The map display portion 1034 shows the demarcation of another key image. By doing so, the depth ambiguity of the first edit is resolved.

At 1016, another edit is made is made to the location of annotation 1046 in the image display portion 1016 that shows an image of the location shown in the time interval 1010/1012 from a different perspective. The map display portion 1036 shows that the epipolar lines do not converge (or will converge at a significantly different distance). Accordingly, a discontinuity 1050 is generated to indicate that annotation positions will not be interpolated between the locations shown in time interval 1014 and time interval 1016.

At 1018, another edit is made is made to the location of annotation 1048 in the image display portion 1018 that shows an image of a different location from the location shown in the preceding time intervals 1010/1012/1014/1016. The map display portion 1038 shows that the epipolar lines converge with the epipolar lines of the neighboring location, accordingly, the annotation 1048 is generated.

Figure 11:
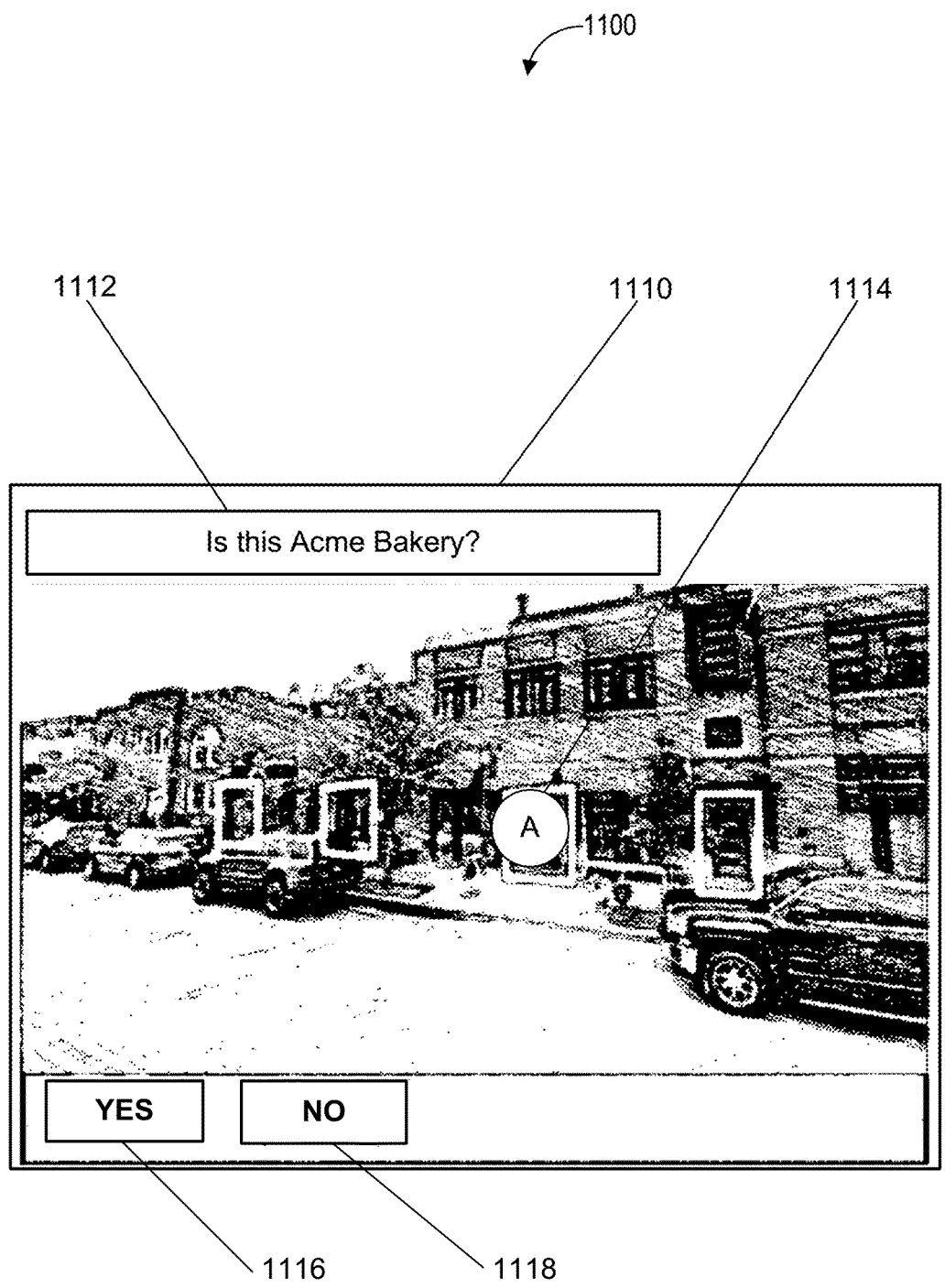
FIG. 11 depicts an example of annotation generation based on image feature extraction according to example embodiments of the present disclosure.

FIG. 11 depicts an example of annotation generation based on image feature extraction according to example embodiments of the present disclosure. FIG. 11 includes an illustration of a computing system 1100 that includes a graphical user interface component 1110. The graphical user interface component 1110 can be displayed on a display device of a computing system (e.g., a display device of the user device 102). The graphical user interface component 1110 can include various interface elements that can be used to access, generate, process, or present (e.g., display) data, including geographical data, to a user as part of an image viewing system that can display images associated with the geographical data. As shown in FIG. 11, the graphical user interface component 1110 includes an indication 1112 ("Is this Acme Bakery?"); an annotation 1114; a control element 1116 ("Yes"); and a control element 1118 ("No").

In an implementation, features of an image, including the image displayed in the graphical user interface component 1110, can be determined (e.g., inferred using machine learning techniques) and an annotation can be generated at a location within the image, based on the determined features of the image. For example, an annotation can be located in proximity to a sign or doorway that is determined to be a feature of an image.

In graphical user interface component 1110, the indication 1112 is generated to request whether the annotation 1114 is associated with the correct location (i.e., Acme Bakery). Based on an input to the control element 1116 (e.g., yes, the annotation is correctly located) or the control element 1118 (e.g., no, the annotation is not correctly located), the annotation 1114 can be maintained or removed from the image that is displayed in the graphical user interface component 1110.

Figure 12:
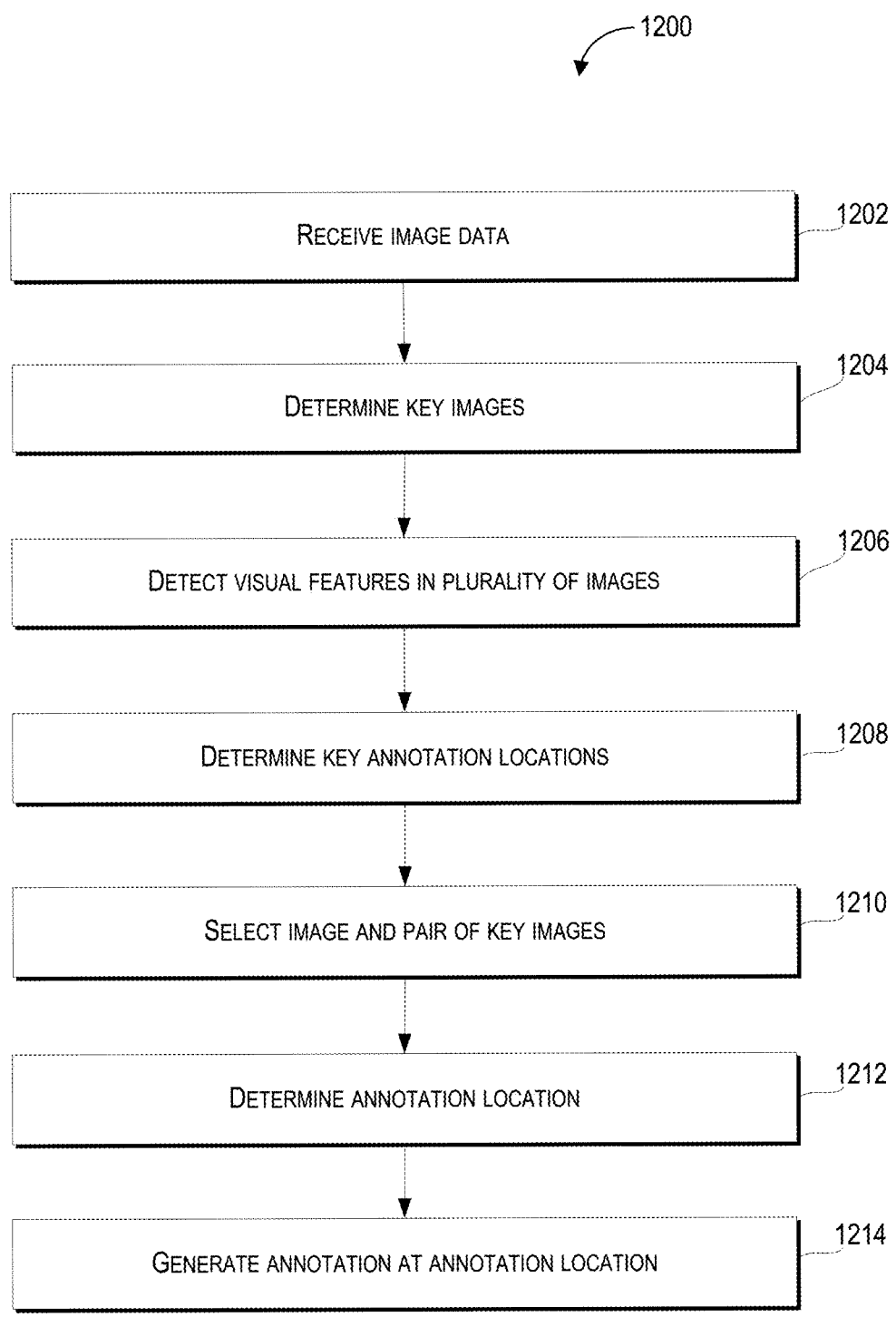
FIG. 12 depicts a flow diagram of an example method of annotation generation for an image network according to example embodiments of the present disclosure.

FIG. 12 depicts a flow diagram of an example method of annotation generation for an image network according to example embodiments of the present disclosure. One or more portions of the method 1200 can be executed or implemented on one or more computing devices or computing systems including, for example, the user device 102, the image data provider 104, and/or the computing device 202. One or more portions of the method 1200 can also be executed or implemented as an algorithm on the hardware components of the devices disclosed herein. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include receiving image data comprising a plurality of images (e.g., two-dimensional representations of locations) that can be associated with a plurality of locations (e.g., places that are respectively located at various latitudes and longitudes or street addresses). For example, the plurality of images can include one or more digital images that represent an image (e.g., a two dimensional image) of a street location at a particular address with different images for different camera perspectives of the street location. The plurality of images can include any type of image format including a combination of raster images (e.g., bitmaps comprising a grid of pixels) or vector images (e.g., polygonal representations of images based on positions of coordinates including x and y axes of a two-dimensional plane). Examples of digital image formats that can be included in the plurality of images include JPEG (Joint Photographic Experts Group), BMP (Bitmap), TIFF (Tagged Image File Format), PNG (Portable Network Graphics), or GIF (Graphics Interchange Format).

The plurality of images can include key images (e.g., images that are associated with one or more annotations, that can be used to determine the location of annotations for other images) that include one or more key annotations (e.g., a combination of a picture or text to indicate a place of interest within an image) located at one or more key annotation locations (e.g., a set of coordinates that indicate the position of an annotation within an image) in the one or more key images. For example, an image of a street can include an annotation for a place of business (e.g., a bank) that is depicted within the image. The location of the annotation can be indicated by a set of x and y coordinates corresponding to a portion of the annotation (e.g., the top left corner of a bitmap image that represents the annotation) within the image.

At 1204, the method 1200 can include determining the one or more key images based in part on one or more key image criteria comprising a minimum distance between a set of the plurality of locations or a maximum distance between a set of the plurality of locations. For example, the distance between a set of the plurality of locations can be based on a number of intervening nodes between a pair of nodes in a graph (e.g., an interpolation graph) corresponding to the images of the plurality of locations.

At 1206, the method 1200 can include detecting one or more visual features in the plurality of images including shape, color (e.g., chrominance), brightness (e.g., luminance), and/or other image properties (e.g., ridges, edges, corners, curves, or blobs) of one or more of the plurality of images. For example, the one or more visual features associated with annotation locations can include a building entranceway, building signage, or a building address marker. The disclosed technology can detect the one or more visual features using, for example, image classification (e.g., unsupervised image classification).

At 1208, the method 1200 can include determining the one or more key annotation locations of the one or more key annotations based in part on the location of the one or more visual features. For example, the image computing system can detect an address that corresponds to the location of a bank (i.e., an address sign indicating the address of the bank) in an image and determine that the key annotation will be located directly above the address.

At 1210, the method 1200 can include selecting at least one image and a pair (i.e., two) of the key images that satisfies one or more annotation criteria based in part on one or more spatial relationships of the plurality of locations associated with the plurality of images. The one or more spatial relationships can include one or more distances, orientations, relative positions, or adjacency relationships between the plurality of locations associated with the images. For example, the one or more annotation criteria can include a criteria that requires a set of the plurality of locations corresponding to the pair of key images to be within a minimum distance (e.g., a minimum number of intervening nodes in an interpolation graph based on the plurality of locations) of the location associated with the image (i.e., the image for which a new annotation will be generated). Other examples of the one or more annotation criteria include a maximum distance requirement (e.g., a set of the plurality of locations cannot be further apart than the maximum number of intervening nodes in an interpolation graph based on the plurality of locations); an orientation requirement (e.g., the locations are required to be facing in the same direction); a relative position requirement (e.g., the locations are required to have a specified position relative to one another including nodes in the interpolation graph being on the same side of a key image node); and/or an adjacency requirement (e.g., the locations are required to be adjacent to one another including adjacent nodes in the interpolation graph).

At 1212, the method 1200 can include determining an annotation location for an annotation in the image based in part on the one or more key annotation locations of the one or more key annotations in the pair of the key images that satisfies the one or more annotation criteria. For example, the annotation location can be based in part on an analysis of the one or more key annotation locations that includes a determination of whether geometric features of the one or more key annotations satisfy one or more criteria including the convergence of epipolar lines based on the one or more key annotation locations. Based on the one or more annotation criteria being satisfied (e.g., the epipolar lines converging within a threshold distance), a range of available locations for the annotation in the image can be determined.

At 1214, the method 1200 can include generating an annotation at the annotation location of the image. For example, the image computing system can send one or more instructions to a remote computing device that manages (e.g., stores, receives, sends, and/or modifies) the plurality of images to modify the image data associated with the image. The modification to the image data associated with the image can include generating an additional image (e.g., an icon representing the annotation in the annotation location), adding the annotation to an existing image, or removing an annotation in an existing image and generating a new annotation in the image. Further, the annotation generated in the annotation location can be output to a display device (e.g., a display on a mobile device).

Figure 13:
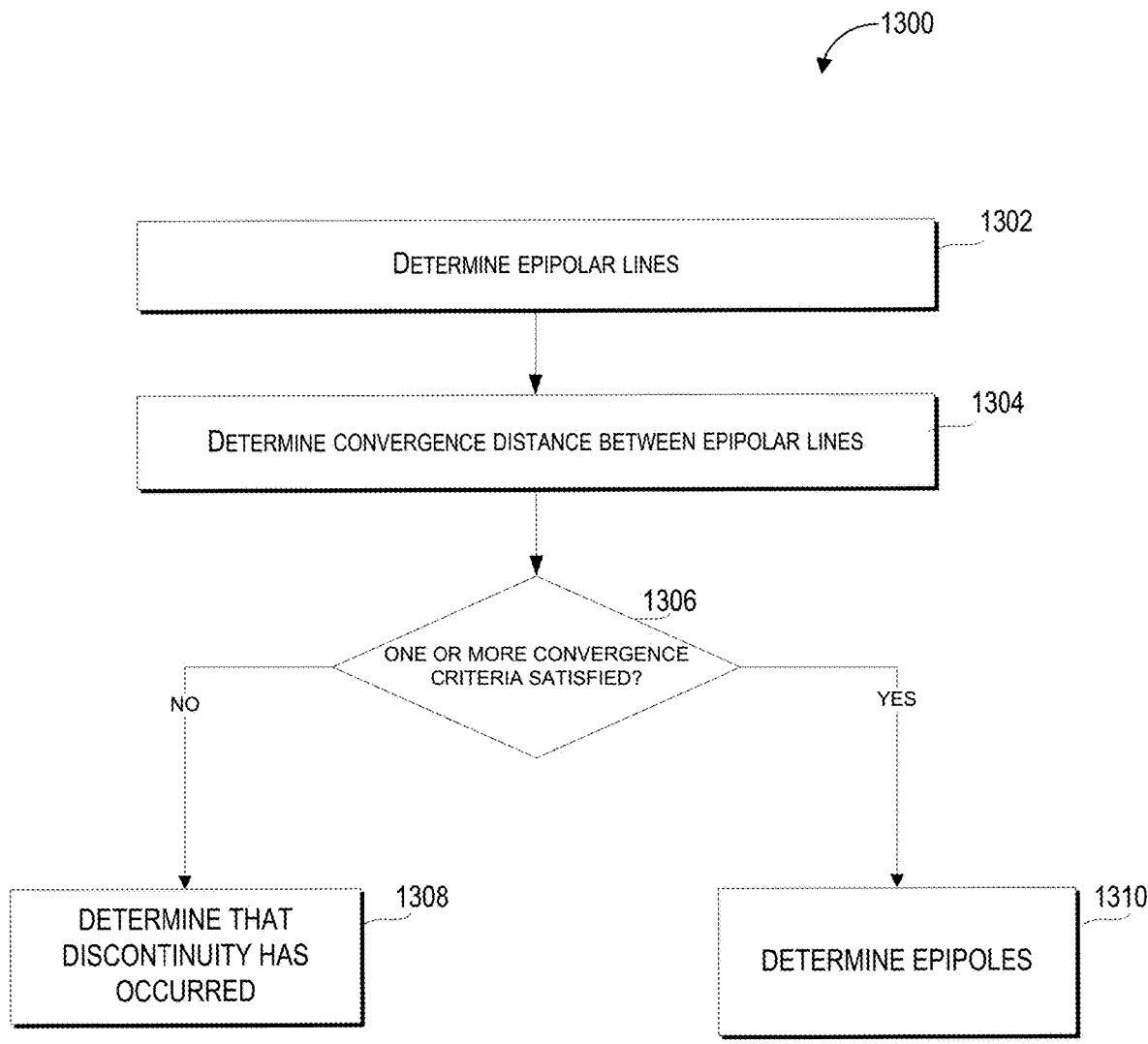
FIG. 13 depicts a flow diagram of an example method of annotation location and discontinuity determination for an image network according to example embodiments of the present disclosure.

FIG. 13 depicts a flow diagram of an example method of annotation location and discontinuity determination for an image network according to example embodiments of the present disclosure. One or more portions of the method 1300 can be executed or implemented on one or more computing devices or computing systems including, for example, the user device 102, the image data provider 104, and/or the computing device 202. One or more portions of the method 1300 can also be executed or implemented as an algorithm on the hardware components of the devices disclosed herein. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include determining an annotation location based on one or more epipolar lines associated with the one or more key annotations of the pair of the key images. The locations of the epipolar lines can be based in part on an optical center (e.g., a focal center of the device that captures an image) of the pair of key images. Determining the annotation location can include determining aspects of the epipolar lines associated with the one or more key annotations of the pair of the key images. The aspects of the epipolar lines can include a starting point (starting at the optical center of the image capture device), an ending point (ending at some point along the epipolar line), or a trajectory of the epipolar lines.

At 1304, the method 1300 can include determining a convergence distance (e.g., a distance at which the epipolar lines converge or intersect) between the epipolar lines. The convergence distance can be determined based in part on the distance between the point of convergence of the epipolar lines and a point of reference including the starting point of one of the epipolar lines.

At 1306, in response to the epipolar lines satisfying one or more convergence criteria the method 1300 proceeds to 1310. In response to the epipolar lines not satisfying the one or more convergence criteria the method 1300 proceeds to 1308. The one or more convergence criteria can include the convergence distance satisfying a threshold convergence distance (e.g., exceeding, equaling, or being less than the threshold convergence distance) or the epipolar lines not converging (e.g., the epipolar lines diverging). For example, parallel epipolar lines will not converge and accordingly will not satisfy the one or more convergence criteria. In an implementation, the one or more convergence criteria can be incorporated into the one or more annotation criteria.

At 1308, the method 1300 can, in response to the determination that the convergence distance does not satisfy the one or more convergence criteria (e.g., the distance is greater than a threshold convergence distance, or the epipolar lines diverge) a discontinuity can be determined to have occurred. The discontinuity can be caused by set of images (e.g., key images) that cannot be used together to determine the position of an annotation in another set of images (e.g., images without annotations).

At 1310, the method 1300 can include determining an epipole for the pair of the key images. The epipole (e.g., epipolar point) is the point at which the epipolar lines converge. The epipole can correspond to a three-dimensional point in the geographical location that is associated with the image for which the annotation will be generated. The annotation location can be based in part on the location of the epipole. For example, the epipole can serve as a single point of reference for a pair of key images for which epipolar lines were determined. Using the location of the epipole, a location for an annotation can be determined for an intermediate image (e.g., a node in the interpolation that is located between two key image nodes) between the pair of key images.

Figure 14:
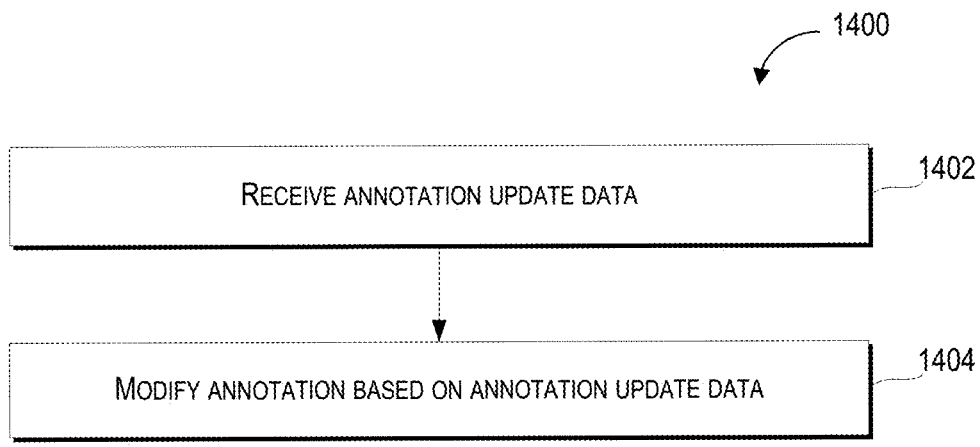
FIG. 14 depicts a flow diagram of modifying an annotation in an image network according to example embodiments of the present disclosure.

FIG. 14 depicts a flow diagram of modifying an annotation in an image network according to example embodiments of the present disclosure. One or more portions of the method 1400 can be executed or implemented on one or more computing devices or computing systems including, for example, the user device 102, the image data provider 104, and/or the computing device 202. One or more portions of the method 1400 can also be executed or implemented as an algorithm on the hardware components of the devices disclosed herein. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include receiving annotation update data that includes a location for an annotation in an image. For example, the annotation update data can include a set of coordinates (e.g., x and y coordinates) of a location within an image in which an annotation will be generated. The annotation update data can be received from various devices including a remote computing system (e.g., a remote server computing device that maintains and provides annotation update data) and/or an input device including a human input device (e.g., a keyboard, mouse, touch screen, and/or microphone). Further, the annotation update data can include the location of an existing annotation within the image. The location of the existing annotation within the image can be used when modifying the annotation location (e.g., the existing annotation can be removed and a new annotation can be generated in the image).

At 1404, the method 1400 can include modifying, based in part on the annotation data, the annotation location. The user can view the visual representation of the image on a display device and modify the annotation via a user interface of the application (e.g., the user can interact with controls of a graphical user interface component to perform modifications to the annotation). For example, a user can use an image modification application that allows for the generation (e.g., creating an annotation within an image), modification (e.g., changing the appearance or location of an annotation), or removal of one or more annotations in an image.

Figure 15:
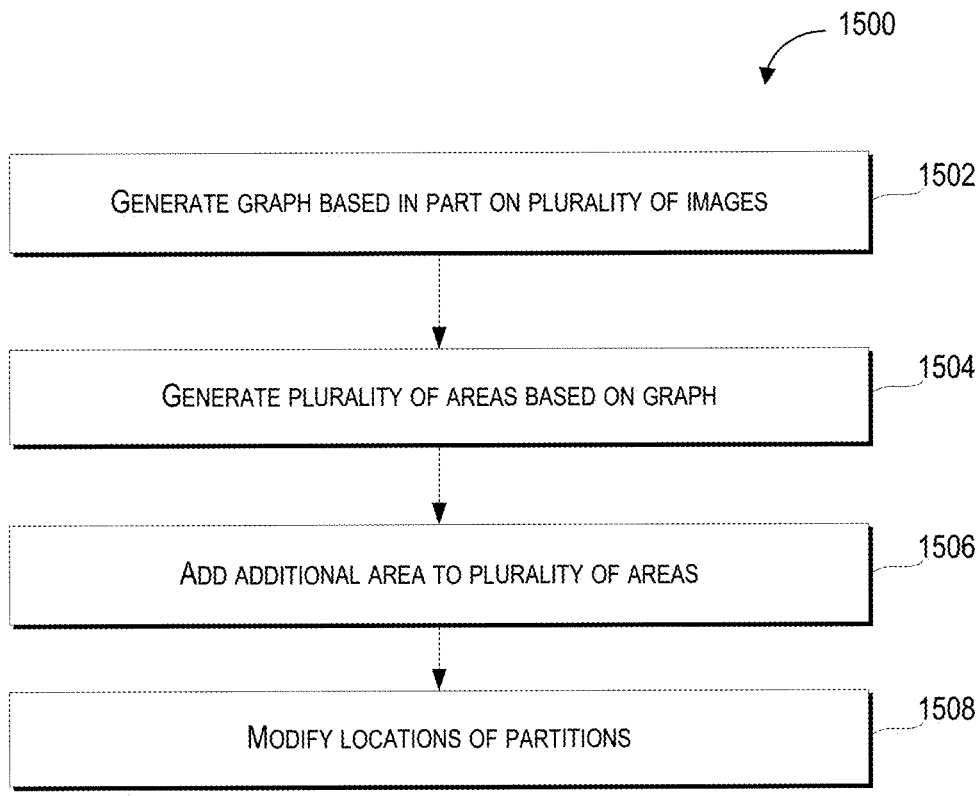
FIG. 15 depicts a flow diagram of generating graph and area diagram representations of an image network according to example embodiments of the present disclosure.

FIG. 15 depicts a flow diagram of generating graph and area diagram representations of an image network according to example embodiments of the present disclosure. One or more portions of the method 1500 can be executed or implemented on one or more computing devices or computing systems including, for example, the user device 102, the image data provider 104, and/or the computing device 202. One or more portions of the method 1500 can also be executed or implemented as an algorithm on the hardware components of the devices disclosed herein. FIG. 15 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include generating a graph that is based in part on the plurality of images. The graph can be used to represent the relative position of the plurality of locations associated with the plurality of images. For example, the graph can include vertices that represent the plurality of images and edges that represent the closest traversable image of the plurality of images. The closest traversable image to an image at a vertex can be, but is not necessarily associated with, another image that is associated with a location that is closest in proximity to the location associated with the image at the vertex.

In another implementation, the graph can include a plurality of nodes corresponding to or associated with the plurality of images (e.g., each of the nodes of the graph can represent one of the plurality of images). The locations (e.g., relative locations) of the plurality of nodes can be based in part on the plurality of locations associated with the plurality of images. At least one of the one or more annotation criteria can be based in part on a pair of the nodes corresponding to or associated with the pair of the key images that is adjacent to a node corresponding to the image.

At 1504, the method 1500 can include generating, based in part on the graph (e.g., the graph generated in 1502), a representation of the nodes in the graph or the plurality of images that includes a plurality of areas associated with the plurality of locations. Each of the plurality of areas can be associated with a node and can be separated by one or more partitions that are based in part on a distance between a set of the plurality of locations. The one or more spatial relationships can be based in part on a shape or size of the plurality of areas. Further, the shape and size of the one or more partitions can be based on a weighting that is applied to each of the nodes. In this way, for example, a Voronoi type diagram can be generated to represent the plurality of images associated with the nodes in the graph.

At 1506, the method 1500 can include adding an additional area to the plurality of areas. The additional area can correspond to an additional image added to the plurality of images. The location of the additional area (e.g., the location of the additional area within the plurality of areas) can be based in part on a location associated with the additional image. For example, an additional image showing a location from a different perspective (e.g., a different camera angle or a different distance) can be added to the plurality of images.

At 1508, the method 1500 can include modifying the locations of the one or more partitions based in part on a location of the additional location relative to the plurality of locations. For example, introducing an additional area to a plurality of areas can include creation of a new partition to separate the additional area from the existing plurality of areas. The locations of the one or more partitions for the additional area can be based in part on the weighting of the plurality of images relative to the image associated with the location that is being added. Further, the location of the one or more partitions can be based in part on the existence of discontinuities that exist between adjacent areas.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of generating annotations in images, the method comprising:
   receiving, by a computing system comprising one or more computing devices, image data comprising a plurality of images associated with a plurality of locations, wherein the plurality of images comprises key images comprising one or more key annotations located at one or more key annotation locations in the key images, and wherein each of the one or more key annotations comprises text associated with a respective key image of the key images;
   selecting, by the computing system, at least one image and a pair of the key images that satisfies one or more annotation criteria based in part on one or more spatial relationships of the plurality of locations associated with the plurality of images;
   determining, by the computing system, an annotation location for an annotation in the at least one image based in part on machine-learning techniques and the one or more key annotation locations of the one or more key annotations in the pair of the key images that satisfies the one or more annotation criteria, wherein the machine-learning techniques comprise detection of one or more visual features in the at least one image; and
   generating, by the computing system, an annotation at the annotation location of the at least one image.

2. The computer-implemented method of claim 1, wherein the one or more spatial relationships comprise one or more threshold distance ranges between the plurality of locations or an adjacency of each of the plurality of locations.

3. The computer-implemented method of claim 1, wherein the determining the annotation location comprises:
   determining, by the computing system, epipolar lines associated with the one or more key annotations of the pair of the key images, wherein locations of the epipolar lines are based in part on an optical center of the pair of key images; and
   responsive to the epipolar lines satisfying one or more convergence criteria, determining, by the computing system, an epipole for the pair of the key images, the one or more convergence criteria comprising the epipolar lines converging, wherein the annotation location is based in part on the location of the epipole.

4. The computer-implemented method of claim 3, further comprising:
   determining, by the computing system, a convergence distance between the epipolar lines; and
   responsive to determining that the convergence distance is greater than a threshold convergence distance or that the epipolar lines diverge, determining, by the computing system, that a discontinuity has occurred, wherein at least one of the one or more annotation criteria is based in part on the discontinuity not occurring.

5. The computer-implemented method of claim 1, further comprising:
   determining, by the computing system, the key images based in part on one or more key image criteria comprising a minimum distance between a set of the plurality of locations or a maximum distance between a set of the plurality of locations.

6. The computer-implemented method of claim 1, further comprising:
   detecting, by the computing system, one or more visual features in the plurality of images, wherein the one or more visual features comprise a building entranceway, building signage, or a building address marker; and determining, by the computing system, the one or more key annotation locations of the one or more key annotations based in part on the location of the one or more visual features.

7. The computer-implemented method of claim 1, further comprising:

generating; by the computing system, a graph based in part on the plurality of images, the graph comprising a plurality of nodes associated with the plurality of images, locations of the plurality of nodes based in part on the plurality of locations associated with the plurality of images, wherein at least one of the one or more annotation criteria is based in part on a pair of the nodes associated with the pair of the key images being adjacent to a node associated with the at least one image.

8. The computer-implemented method of claim 7, further comprising:

generating, by the computing system, based in part on the graph, a plurality of areas associated with the plurality of nodes, wherein the plurality of areas is separated by one or more partitions based in part on a distance between the plurality of nodes, wherein the one or more spatial relationships are based in part on a shape, size, or relative position of the plurality of areas.

9. The computer-implemented method of claim 8, further comprising:

adding, by the computing system, an additional area to the plurality of areas, wherein the additional area corresponds to an additional image added to the plurality of images, the location of the additional area based in part on an additional location associated with the additional image; and modifying, by the computing system, the locations of the one or more partitions based in part on a location of the additional location relative to the plurality of locations.

10. The computer-implemented method of claim 1, further comprising:

receiving, by the computing system, annotation update data comprising a location for the annotation in the at least one image, wherein the annotation update data is received from a remote computing device or one or more inputs of an input device; and modifying, by the computing system, the annotation location of the annotation based in part on the annotation update data.

11. One or more tangible non-transitory computer-readable media storing computer-readable instructions that when executed by one or more processors cause the one or more processors to perform operations, the operations comprising:

receiving image data comprising a plurality of images associated with a plurality of locations, wherein the plurality of images comprises key images comprising one or more key annotations located at one or more key annotation locations in the key images, and wherein each of the one or more key annotations comprises text associated with a respective key image of the key images;

selecting at least one image and a pair of the key images that satisfies one or more annotation criteria based in part on one or more spatial relationships of the plurality of locations associated with the plurality of images;

determining an annotation location for an annotation in the at least one image based in part on machine-learning techniques and the one or more key annotation locations of the one or more key annotations in the pair of the key images that satisfies the one or more annotation criteria, wherein the machine-learning techniques comprise detection of one or more visual features in the at least one image; and generating an annotation at the annotation location of the at least one image.

12. The one or more tangible non-transitory computer-readable media of claim 11, wherein the one or more spatial relationships comprise one or more threshold distance ranges between the plurality of locations or an adjacency of each of the plurality of locations.

13. The one or more tangible non-transitory computer-readable media of claim 11, wherein the determining the annotation location comprises:

determining epipolar lines associated with the one or more key annotations of the pair of the key images, wherein locations of the epipolar lines are based in part on an optical center of the pair of key images; and responsive to the epipolar lines satisfying one or more convergence criteria, determining an epipole for the pair of the key images, the one or more convergence criteria comprising the epipolar lines converging, wherein the annotation location is based in part on the location of the epipole.

14. The one or more tangible non-transitory computer-readable media of claim 13, further comprising:

determining a convergence distance between the epipolar lines; and responsive to determining that the convergence distance is greater than a threshold convergence distance or that the epipolar lines diverge, determining, that a discontinuity has occurred, wherein at least one of the one or more annotation criteria is based in part on the discontinuity not occurring.

15. The one or more tangible non-transitory computer-readable media of claim 11, further comprising:

determining the key images based in part on one or more key image criteria comprising a minimum distance between a set of the plurality of locations or a maximum distance between a set of the plurality of locations.

16. A computing system comprising:

one or more processors;

one or more non-transitory computer-readable media storing instructions that when executed by the one or more processors cause the one or more processors to perform operations comprising:

receiving image data comprising a plurality of images associated with a plurality of locations, wherein the plurality of images comprises key images comprising one or more key annotations located at one or more key annotation locations in the key images, and wherein each of the one or more key annotations comprises text associated with a respective key image of the key images;

selecting at least one image and a pair of the key images that satisfies one or more annotation criteria based in part on one or more spatial relationships of the plurality of locations associated with the plurality of images;

determining an annotation location for an annotation in the at least one image based in part on machine-learning techniques and the one or more key annotation locations of the one or more key annotations in the pair of the key images that satisfies the one or more annotation criteria, wherein the machine-learning techniques comprise detection of one or more visual features in the at least one image; and generating an annotation at the annotation location of the at least one image.

17. The computing system of claim 16, wherein the one or more spatial relationships comprise one or more threshold distance ranges between the plurality of locations or an adjacency of each of the plurality of locations.

18. The computing system of claim 6, wherein the determining the annotation location comprises:

determining epipolar lines associated with the one or more key annotations of the pair of the key images, wherein locations of the epipolar lines are based in part on an optical center of the pair of key images; and responsive to the epipolar lines satisfying one or more convergence criteria, determining an epipole for the pair of the key images, the one or more convergence criteria comprising the epipolar lines converging, wherein the annotation location is based in part on the location of the epipole.

19. The computing system of claim 18, further comprising:

determining a convergence distance between the epipolar lines; and responsive to determining that the convergence distance is greater than a threshold convergence distance or that the epipolar lines diverge, determining, that a discontinuity has occurred, wherein at least one of the one or more annotation criteria is based in part on the discontinuity not occurring.

20. The computing system of claim 16, further comprising:

determining the key images based in part on one or more key image criteria comprising a minimum distance between a set of the plurality of locations or a maximum distance between a set of the plurality of locations.

* * * * *

UNITED STATES PATENT AND TRADEMARK OFFICE
CERTIFICATE OF CORRECTION

PATENT NO. : 10,733,777 B2
APPLICATION NO. : 16/007106
DATED : August 4, 2020
INVENTOR(S) : Schpok Page 1 of 1

It is certified that error appears in the above-identified patent and that said Letters Patent is hereby corrected as shown below:

In the Claims

Column 25, Line 9 Claim 18 after the word "claim", please delete "6" and insert --16--

Signed and Sealed this
Twenty-seventh Day of October, 2020

Andrei Iancu
*Director of the United States Patent and Trademark Office*